(12) United States Patent
Maeda

(10) Patent No.: US 11,845,293 B2
(45) Date of Patent: Dec. 19, 2023

(54) PRINTING DEVICE PERFORMING PRINTING OPERATIONS ON CONTINUOUS MEDIUM INCLUDING A PLURALITY OF PRINT MEDIA EACH HAVING INFORMATION STORAGE MEDIUM

(71) Applicant: BROTHER KOGYO KABUSHIKI KAISHA, Nagoya (JP)

(72) Inventor: Jyunji Maeda, Ichinomiya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/861,211

(22) Filed: Jul. 9, 2022

(65) Prior Publication Data

US 2023/0022340 A1 Jan. 26, 2023

(30) Foreign Application Priority Data

Jul. 16, 2021 (JP) .................................. 2021-117542

(51) Int. Cl.
*B41J 3/50* (2006.01)
*B41J 11/46* (2006.01)
*G06K 17/00* (2006.01)

(52) U.S. Cl.
CPC ................. *B41J 3/50* (2013.01); *B41J 11/46* (2013.01); *G06K 17/0025* (2013.01)

(58) Field of Classification Search
CPC ..................................... B41J 3/50; B41J 11/46
USPC ...................................................... 235/439
See application file for complete search history.

(56) References Cited

U.S. PATENT DOCUMENTS

| 2004/0126124 | A1* | 7/2004 | Inoue | G03G 15/5054 |
| | | | | 399/44 |
| 2007/0223023 | A1* | 9/2007 | Yamazaki | H04N 1/00291 |
| | | | | 358/1.15 |
| 2009/0067910 | A1 | 3/2009 | Sugiyama | |
| 2022/0189003 | A1* | 6/2022 | Ishii | G06T 7/001 |

FOREIGN PATENT DOCUMENTS

| JP | 2005-271951 A | 10/2005 |
| JP | 2005-346128 A | 12/2005 |
| JP | 2006-272842 A | 10/2006 |
| JP | 2008-126456 A | 6/2008 |
| JP | 2008-307752 A | 12/2008 |
| JP | 2009-083459 A | 4/2009 |

* cited by examiner

*Primary Examiner* — Allyson N Trail
(74) *Attorney, Agent, or Firm* — KENEALY VAIDYA LLP

(57) ABSTRACT

In a printing device, a controller is configured to perform: (a) writing; (b) printing; (c) determining; (d) conveying; (e) writing; (f) printing; and (g) writing. The (a) writing writes prescribed information to an information storage medium provided in a first print medium. The (b) printing prints a prescribed image on the first print medium. In response to determining in (c) that the printing quality of the prescribed image is not good for the first print medium, the (d) conveying conveys a continuous medium in a reverse direction, the (e) writing writes void information to the information storage medium provided in the first print medium, the (f) printing prints a VOID image on the first print medium after the (e) writing is performed, and the (g) writing writes the prescribed information to the information storage medium provided in a second print medium prior to performing the (f) printing.

24 Claims, 14 Drawing Sheets

FIG. 4

| No. | CODE IMAGE INFORMATION | PRESCRIBED INFORMATION |
|---|---|---|
| | DATABASE 80 | |
| A001 | AaBA.gif | 42059179 |
| A002 | cAbB.gif | 26582690 |
| A003 | ZdHk.gif | 59379874 |
| A004 | bCbf.gif | 73658283 |
| A005 | EYbu.gif | 46516586 |
| A006 | CPgm.gif | 71972763 |
| ⋮ | ⋮ | ⋮ |

PRINTING DEVICE PERFORMING PRINTING OPERATIONS ON CONTINUOUS MEDIUM INCLUDING A PLURALITY OF PRINT MEDIA EACH HAVING INFORMATION STORAGE MEDIUM

CROSS REFERENCE TO RELATED APPLICATIONS

This application claims priority from Japanese Patent Application No. 2021-117542 filed Jul. 16, 2021. The entire content of the priority application is incorporated herein by reference.

BACKGROUND

Conventional printing devices known in the art prints on labels each having a built-in information storage medium such as a radio-frequency identification (RFID) tag and writes electronic information to each information storage medium. Japanese Patent Application Publication No. 2005-271951 discloses a printing device that performs printing operations on a medium comprising a continuous label backing paper to which are affixed a plurality of labels furnished with RFID tags. The printing device conveys the medium in a forward direction along a conveying path, while simultaneously writing electronic information to the RFID tags and printing on a printing surface of the labels. If this printing device determines that electronic information has not been properly written to an RFID tag, the device conveys the corresponding label in a reverse direction, opposite to the forward direction, until the label reaches the printing position on the conveying path. A printing unit provided in the printing position subsequently prints "defective" information over the printing surface of the label to indicate that electronic information has not been properly written to the RFID tag in the label.

A printing device disclosed in Japanese Patent Application Publication No. 2006-272842 writes electronic information to an RFID tag embedded in the second from the last label "E-1" and prints on the printing surface of the label "E-1". Subsequently, the printing device writes electronic information to the RFID tag embedded in the label "E" following the label "E-1".

SUMMARY

When the quality of printing executed on the printing surface of a label is judged to be poor, electronic information to that effect may be written to the information storage medium provided on the corresponding label. In such cases, the label corresponding to the information storage medium must be conveyed in the reverse direction to the position of the writing unit that writes electronic information. However, the more frequently such reverse conveyances occur, the longer it takes to complete the writing of information to information storage media and the printing of labels.

In view of the foregoing, it is an object of the present disclosure to provide a printing device, a printing method, and a storage medium storing a set of computer-readable instructions capable of reducing the time required to write electronic information to information storage media and to print labels by minimizing the conveyance frequency of the printing media.

In order to attain the above and other objects, according to the first aspect, the present disclosure provides a printing device including: a conveyor; a writer; a printer; a reader; and a controller. The conveyor is configured to convey a continuous medium in a conveying direction including a forward direction and a reverse direction opposite to the forward direction. The continuous medium extends in a longitudinal direction. The continuous medium includes a plurality of print media arranged in sequence in the longitudinal direction. The conveying direction is parallel to the longitudinal direction. The plurality of print media includes a first print medium and at least one second print medium arranged upstream of the first print medium in the forward direction. Each of the plurality of print media has an information storage medium. The writer is configured to write electronic information to the information storage medium. The printer is disposed downstream of the writer in the forward direction. The printer is configured to print an image representing print content on each of the plurality of print media while the conveyor conveys the continuous medium in the conveying direction. The reader is disposed downstream of the printer in the forward direction. The reader is configured to read the print content represented by the image printed on each of the plurality of print media. The controller is configured to control the conveyor, the writer, the printer, and the reader. The controller is configured to perform: (a) writing; (b) printing; (c) determining; (d) conveying; (e) writing; (f) printing; and (g) writing. The (a) writing writes prescribed information to the information storage medium provided in the first print medium. The (b) printing prints a prescribed image representing prescribed content on the first print medium after the (a) writing is performed on the first print medium. The (c) determining determines whether printing quality of the prescribed image printed on the first print medium is good using a reading result of the prescribed content represented by the prescribed image printed on the first print medium. The (d) conveying conveys the continuous medium in the reverse direction until the first print medium reaches a prescribed position based on a determination result in (c). The (e) writing writes, in response to determining in (c) that the printing quality of the prescribed image is not good for the first print medium, void information to the information storage medium provided in the first print medium. The void information indicates that the printing quality of the prescribed image is not good. The (f) printing prints, in response to determining in (c) that the printing quality of the prescribed image is not good for the first print medium, a VOID image on the first print medium after the (e) writing is performed on the first print medium. The (g) writing writes, in response to determining in (c) that the printing quality of the prescribed image is not good for the first print medium, the prescribed information to the information storage medium provided in each of the at least one second print medium prior to performing the (f) printing.

With the printing device according to the first aspect of the present disclosure, when determining that the printing quality of the prescribed image printed on the first print medium is not good, the printing device writes the void information indicating that the printing quality of the prescribed image is not good to the information storage medium provided on the first print medium. Further, the printing device prints the VOID image indicating that the printing quality of the prescribed image is not good on the first print medium. With this action, the printing device prevents the first print medium from being subsequently used by mistake. In addition, when the printing device determines that the printing quality of the prescribed image printed on the first print medium is not good, the printing device executes the writing of the void information to the information storage medium provided in the first print medium prior to executing the printing of the VOID image on the first print medium during conveying the continuous medium in the reverse direction. Accordingly, the printing device can reduce the number of times the continuous medium is conveyed, and particularly the frequency of reverse feeding of the second print medium, compared to the conventional technology in which the printing of the VOID image on the first print medium is first executed and then the writing of the void information to the information storage medium provided in the first print medium. Therefore, the printing device can reduce the time required to write the prescribed information and void information to the information storage media on the print media and to print the prescribed images and VOID images on the print media.

According to the second aspect, the present disclosure provides a printing method for performing printing operations on a continuous medium with a printing device. The printing device includes: a conveyor; a writer; a printer; and a reader. The writer is configured to convey the continuous medium in a conveying direction including a forward direction and a reverse direction opposite to the forward direction. The continuous medium extends in a longitudinal direction. The continuous medium includes a plurality of print media arranged in sequence in the longitudinal direction. The conveying direction is parallel to the longitudinal direction. The plurality of print media includes a first print medium and at least one second print medium arranged upstream of the first print medium in the forward direction. Each of the plurality of print media has an information storage medium. The writer is configured to write electronic information to the information storage medium. The printer is configured to print an image representing print content on each of the plurality of print media while the conveyor conveys the continuous medium in the conveying direction. The reader is configured to read the print content represented by the image printed on each of the plurality of print media. The printing method includes: (a) writing; (b) printing; (c) determining; (d) conveying; (e) writing; (f) printing; and (g) writing. The (a) writing writes prescribed information to the information storage medium provided in the first print medium. The (b) printing prints a prescribed image representing prescribed content on the first print medium after the (a) writing is performed on the first print medium. The (c) determining determines whether printing quality of the prescribed image printed on the first print medium is good using a reading result of the prescribed content represented by the prescribed image printed on the first print medium. The (d) conveying conveys the continuous medium in the reverse direction until the first print medium reaches a prescribed position based on a determination result in (c). The (e) writing writes, in response to determining in (c) that the printing quality of the prescribed image is not good for the first print medium, void information to the information storage medium provided in the first print medium. The void information indicates that the printing quality of the prescribed image is not good. The (f) printing prints, in response to determining in (c) that the printing quality of the prescribed image is not good for the first print medium, a VOID image on the first print medium after the (e) writing is performed on the first print medium. The (g) writing writes, in response to determining in (c) that the printing quality of the prescribed image is not good for the first print medium, the prescribed information to the information storage medium provided in each of the at least one second print medium prior to performing the (f) printing.

According to the third aspect, the present disclosure provides a non-transitory computer-readable storage medium storing a set of computer-readable instructions for performing printing operations on a continuous medium with a printing device. The printing device includes: a conveyor; a writer; a printer; and a reader. The conveyor is configured to convey the continuous medium in a conveying direction including a forward direction and a reverse direction opposite to the forward direction. The continuous medium extends in a longitudinal direction. The continuous medium includes a plurality of print media arranged in sequence in the longitudinal direction. The conveying direction is parallel to the longitudinal direction. The plurality of print media includes a first print medium and at least one second print medium arranged upstream of the first print medium in the forward direction. Each of the plurality of print media has an information storage medium. The writer is configured to write electronic information to the information storage medium. The printer is configured to print an image representing print content on each of the plurality of print media while the conveyor conveys the continuous medium in the conveying direction. The reader is configured to read the print content represented by the image printed on each of the plurality of print media. The set of computer-readable instructions includes: (a) writing; (b) printing; (c) determining; (d) conveying; (e) writing; (f) printing; and (g) writing. The (a) writing writes prescribed information to the information storage medium provided in the first print medium. The (b) printing prints a prescribed image representing prescribed content on the first print medium after the (a) writing is performed on the first print medium. The (c) determining determines whether printing quality of the prescribed image printed on the first print medium is good using a reading result of the prescribed content represented by the prescribed image printed on the first print medium. The (d) conveying conveys the continuous medium in the reverse direction until the first print medium reaches a prescribed position based on a determination result in (c). The (e) writing writes, in response to determining in (c) that the printing quality of the prescribed image is not good for the first print medium, void information to the information storage medium provided in the first print medium. The void information indicates that the printing quality of the prescribed image is not good. The (f) printing prints, in response to determining in (c) that the printing quality of the prescribed image is not good for the first print medium, a VOID image on the first print medium after the (e) writing is performed on the first print medium. The (g) writing writes, in response to determining in (c) that the printing quality of the prescribed image is not good for the first print medium, the prescribed information to the information storage medium provided in each of the at least one second print medium prior to performing the (f) printing.

By executing the method according to the second aspect or the computer-readable instructions stored in the storage medium according to the third aspect of the present disclosure, the same effects as in the first aspect are achieved.

BRIEF DESCRIPTION OF THE DRAWINGS

The particular features and advantages of the disclosure as well as other objects will become apparent from the following description taken in connection with the accompanying drawings, in which:

FIG. 4 is an explanatory diagram of a database;

DETAILED DESCRIPTION

Figure 1:
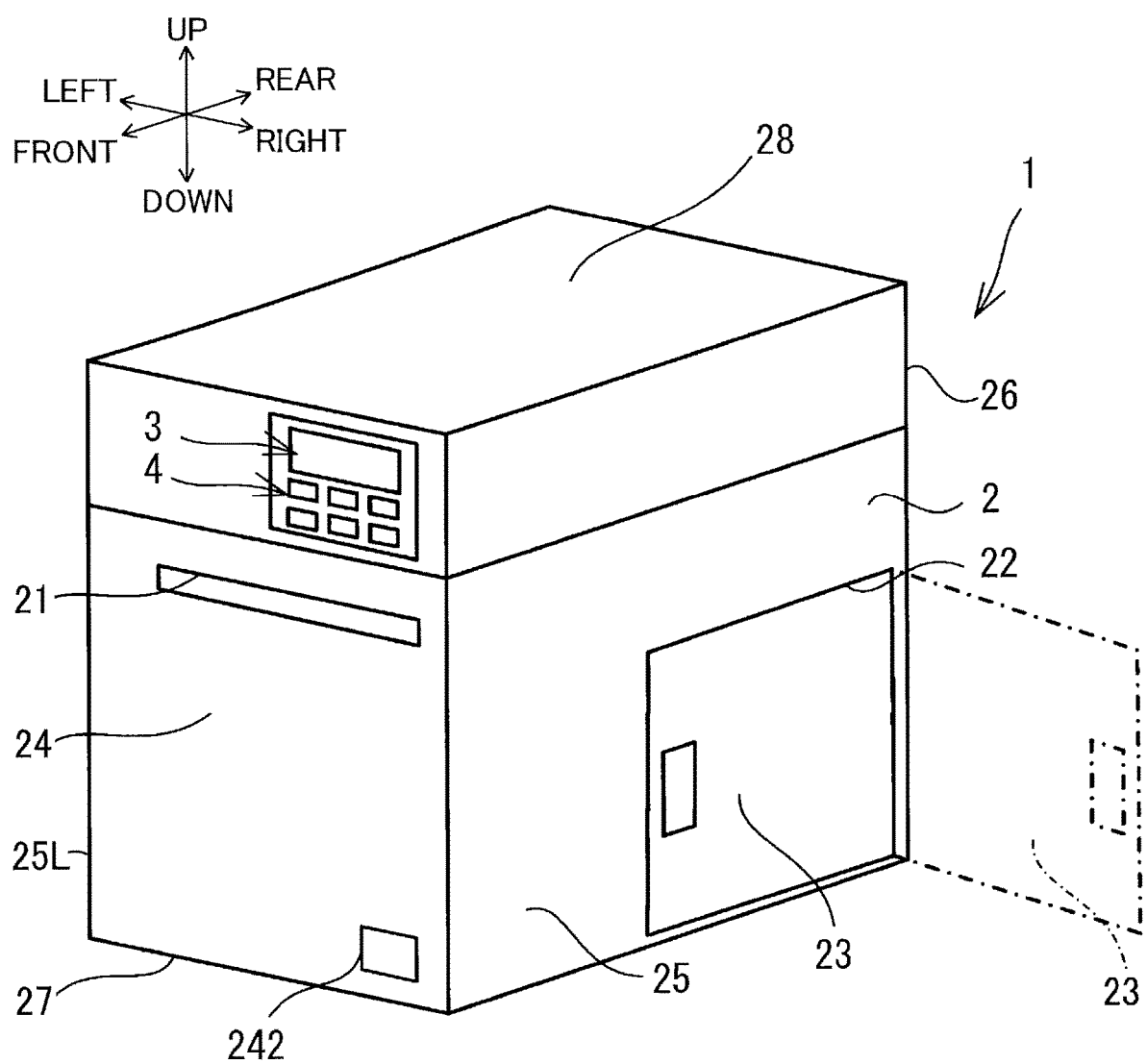
FIG. 1 is a perspective view of a printing device.

Next, a printing device 1 according to a first embodiment of the present disclosure will be described with reference to FIGS. 1 through 8. The drawings referenced below are used to describe the technical features made possible with the present disclosure. The configurations and the like of devices included therein are merely examples, and the present example is not intended to be limited to these configurations and the like. Directions in the following description will conform to the left, right, front, rear, up, and down arrows depicted in the drawings.

First, the structure of the printing device 1 will be described with reference to FIGS. 1 and 2. As shown in FIG. 1, the printing device 1 is provided with a casing 2, a display unit 3, an operation unit 4, and an external device connector 242.

The casing 2 has a front wall 24, a right wall 25, a rear wall 26, a left wall 25L, a bottom wall 27, a top wall 28, and a cover 23. The casing 2 has a rectangular parallelepiped shape of a size suitable for being placed on a tabletop. A discharge port 21 and a media access opening 22 are formed in the casing 2. The discharge port 21 is formed in the front wall 24 of the casing 2. The discharge port 21 has a narrow rectangular shape in a front-side view and is elongated in the left-right direction. The media access opening 22 is formed in the lower-rear section of the right wall 25 and has a rectangular shape in a right-side view. The cover 23 is a plate having a rectangular shape in a right-side view. The cover 23 is supported in the lower-rear section on the right-side surface of the casing 2 and is rotatable between a closed position depicted by a solid line in FIG. 1 for covering the media access opening 22, and an open position depicted by a one-dot chain line in FIG. 1 for exposing the media access opening 22.

The display unit 3 is disposed in the upper-right section on the front surface of the front wall 24. The display unit 3 displays images. The operation unit 4 is also disposed in the upper-right section on the front surface of the front wall 24 beneath the display unit 3. The operation unit 4 comprises a plurality of buttons for inputting various instructions. The display unit 3 and operation unit 4 are located above the discharge port 21. The external device connector 242 is disposed in the lower-right section of the front wall 24.

Figure 2:
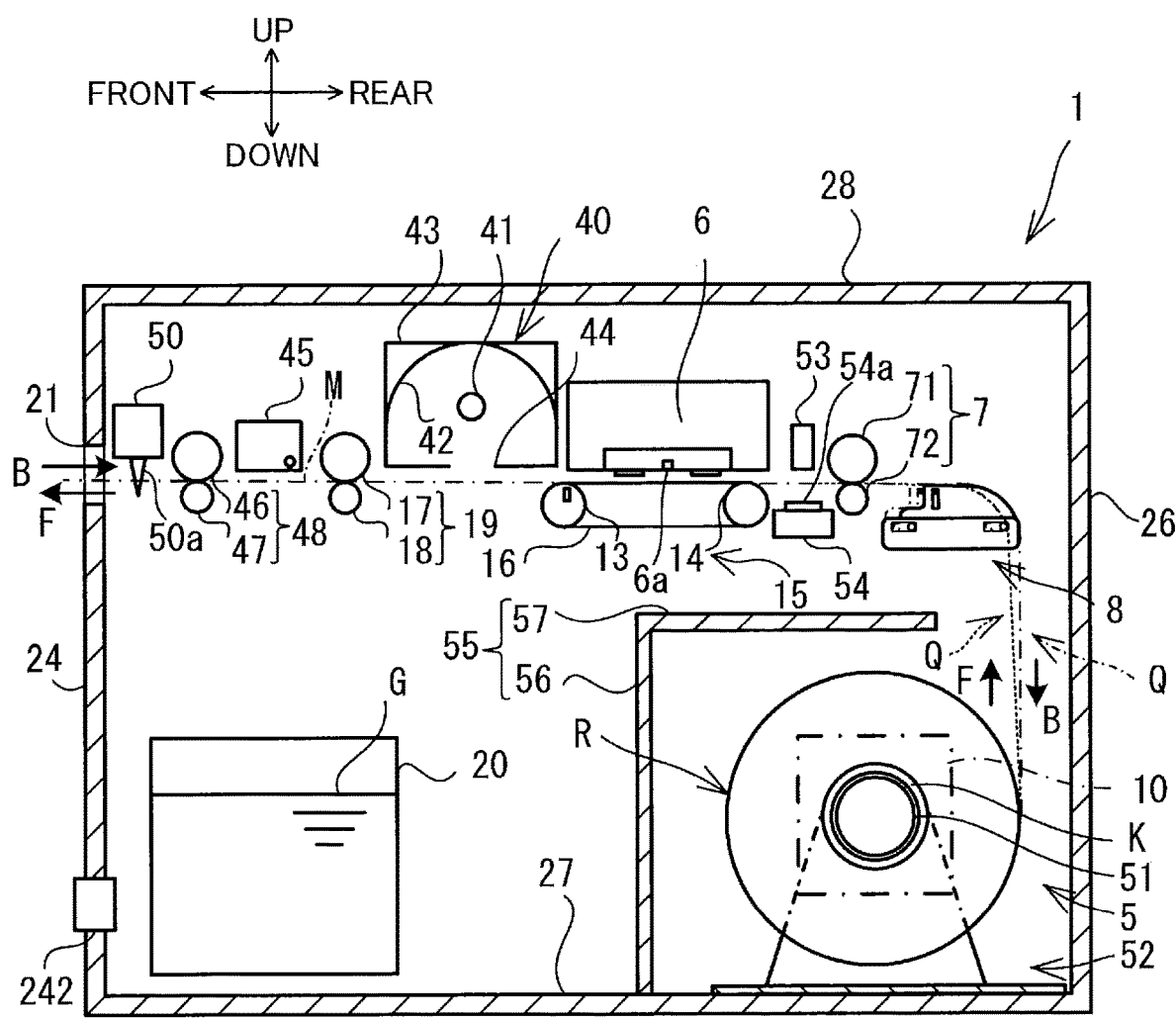
FIG. 2 is a schematic cross-sectional view illustrating an internal structure of the printing device.

As shown in FIG. 2, within the casing 2 the printing device 1 accommodates a first conveying unit 10, a media retaining unit 5, a partitioning wall 55, a back tensioning unit 8, a second conveying unit 7, a media detection unit 53, an information writing unit 54, a printing unit 6, a third conveying unit 15, a fixing unit 40, a fourth conveying unit 19, a reading unit 45, a fifth conveying unit 48, and a cutting unit 50.

The printing device 1 is an inkjet printer that performs printing operations on a long continuous medium M. The continuous medium M is a long continuous sheet of backing paper, for example, that has been wound into a roll shape around a cylindrical paper tube K. The continuous medium M includes a plurality of print labels L (shown in FIG. 6) as a plurality of print media arranged in sequence along the longitudinal direction of the continuous medium M and affixed to the backing paper with adhesive. Alternatively, the continuous medium M may be a linerless tape having no backing paper. In the present embodiment, the print labels L are paper labels. Each of the print labels L is provided with an RFID tag T shown in FIG. 6 as an information storage medium to which electronic information can be written. The RFID tag T is capable of preserving various types of information electronically. In the present embodiment, the RFID tag T is affixed to the back surface of each print label L with adhesive.

The partitioning wall 55 has a first wall portion 56 that extends upward from the bottom wall 27 of the casing 2, and a second wall portion 57 that extends rearward from the top edge of the first wall portion 56. The partitioning wall 55 divides the interior space of the casing 2. The second wall portion 57 is separated from the rear wall 26 of the casing 2 in the front-rear direction.

The media retaining unit 5 is arranged in a space formed in the lower-rear portion of the printing device 1 that is enclosed by the partitioning wall 55 and the casing 2, and is positioned to the left of the cover 23 when the cover 23 is in the closed position. The media retaining unit 5 holds the long continuous medium M. Specifically, the continuous medium M is wound into a roll R, which is retained in the media retaining unit 5. In forming the roll R, the continuous medium M is wound such that the print labels L face outward. In the present embodiment, the media retaining unit 5 is provided with a shaft 51, and a magazine 52. The shaft 51 extends in the left-right direction and is inserted into the paper tube K of the roll R. The magazine 52 is a support base that is U-shaped in a front-side view. The magazine 52 rotatably supports both left and right ends of the shaft 51 so that the shaft 51 can rotate about an axis extending in the left-right direction. The shaft 51 is detachably supported on the magazine 52. The magazine 52 is detachably supported in the printing device 1. To replace the roll R, the user of the printing device 1 places the cover 23 in the open position, removes the magazine 52 from the interior of the casing 2, and replaces the roll R in the magazine 52. Note that the roll R may be wound into a roll shape that is mountable in the media retaining unit 5 without the need for the paper tube K.

The first conveying unit 10 conveys the continuous medium M in a forward direction F and a reverse direction B opposite to the forward direction F. The forward direction F is the direction from the media retaining unit 5 toward the printing unit 6 along a conveying path Q. The conveying path Q is the path along which the continuous medium M is conveyed after being paid out from the media retaining unit 5 until being discharged from the casing 2 through the discharge port 21. Hereinafter, any direction along the conveying path Q will be called the conveying direction. The conveying direction crosses the left-right direction along which the rotational axis of the roll R extends and changes according to the position on the conveying path Q. The first conveying unit 10 is disposed upstream of the second conveying unit 7 in the forward direction F. In the present embodiment, the first conveying unit 10 is detachably engaged with the shaft 51 of the media retaining unit 5. The first conveying unit 10 transmits the drive force of a first conveyance drive unit 11 described later in FIG. 3 to the shaft 51 for rotating the shaft 51. During normal rotation, the first conveying unit 10 rotates the roll R retained in the media retaining unit 5 to pay out the continuous medium M and convey the continuous medium M in the forward direction F toward the printing unit 6. During reverse rotation, the first conveying unit 10 rotates the roll R retained in the media retaining unit 5 to convey the continuous medium M in the reverse direction B and take up the continuous medium M on the roll R.

The second conveying unit 7 conveys the continuous medium M in both the forward direction F and the reverse direction B. The second conveying unit 7 is disposed upstream of the information writing unit 54 and printing unit 6 in the forward direction F and downstream of the media retaining unit 5 in the forward direction F. In the present embodiment, the second conveying unit 7 has a conveying roller 71 that rotates about an axis extending in the left-right direction, and a pinch roller 72 disposed below the conveying roller 71. The second conveying unit 7 conveys the continuous medium M while the continuous medium M is nipped from above and below by the conveying roller 71 and pinch roller 72.

The back tensioning unit 8 applies back tension to the continuous medium M at a position on the conveying path Q between the media retaining unit 5 and the second conveying unit 7. Back tension is a tensile force applied in the direction opposite to the direction in which the continuous medium M travels. The back tensioning unit 8 is disposed upstream of the second conveying unit 7 in the forward direction F and downstream of the first conveying unit 10 in the forward direction F. The back tensioning unit 8 contacts the continuous medium M and urges the continuous medium M in a direction crossing the forward direction F. The back tensioning unit 8 is arranged behind the second conveying unit 7 and above the media retaining unit 5. The direction in which the continuous medium M is conveyed from the media retaining unit 5 to the back tensioning unit 8 varies according to the remaining amount of continuous medium M but is generally upward when the residual quantity of continuous medium M is an initial value (the residual quantity just after the roll R has been replaced), as shown in FIG. 2. The direction in which the continuous medium M is conveyed from the back tensioning unit 8 to the discharge port 21 is generally forward. Hence, the conveying path Q in the printing device 1 bends in the region at which the continuous medium M contacts the back tensioning unit 8 so that the conveying direction changes from upward to forward.

The media detection unit 53 is a well-known optical sensor capable of detecting the continuous medium M. The media detection unit 53 is provided with a light-emitting unit and a light-receiving unit and detects whether the light-receiving unit has received light emitted from the light-emitting unit. The media detection unit 53 is arranged above the conveying path Q between the second conveying unit 7 and printing unit 6. The media detection unit 53 is disposed above the information writing unit 54. The media detection unit 53 detects the leading edge of the continuous medium M being conveyed in the forward direction F.

The information writing unit 54 is disposed below the media detection unit 53. The information writing unit 54 is positioned downstream of the second conveying unit 7 in the forward direction F. The information writing unit 54 writes electronic information to the RFID tag T provided on each of the plurality of print labels L in the continuous medium M while the continuous medium M is paid off and conveyed from the media retaining unit 5. In the present embodiment, the information writing unit 54 is provided with an antenna 54a. The antenna 54a transmits radio waves to the RFID tag T for writing electronic information or receives radio waves transmitted from the RFID tag T. The information writing unit 54 is arranged beneath the conveying path Q of the continuous medium M with the antenna 54a facing upward. The position of the information writing unit 54 is fixed. Electronic information is written to and read from the RFID tag T by radio waves transmitted between the RFID tag T furnished on the print label L and the antenna 54a of the information writing unit 54. In other words, the information writing unit 54 is an RFID reader/writer capable of both writing electronic information to the RFID tag T and reading electronic information from the RFID tag T. When electronic information is written to and read from an RFID tag T in the present embodiment, conveyance of the continuous medium M along the conveying direction is temporarily halted so that the RFID tag T being subjected to the write and/or read is stopped for a prescribed time in a position at which the RFID tag T can transmit radio waves to and receive radio waves from the antenna 54a.

The printing unit 6 is disposed downstream of the information writing unit 54 in the forward direction F. The printing unit 6 prints an image on each of the print labels L in the continuous medium M being conveyed along the conveying direction. In the present embodiment, the printing unit 6 is an inkjet head provided with a plurality of nozzles 6a that eject a liquid G in an ejecting direction. By ejecting the liquid G from the nozzles 6a, the printing unit 6 prints images on the print labels L. The ejecting direction in the present embodiment is downward. The printing unit 6 is arranged above the conveying path Q for the continuous medium M so that the nozzles 6a face downward. The position of the printing unit 6 is fixed. The printing unit 6 forms an image on a print label L by ejecting the liquid G from the nozzles 6a toward the print label L as the print label L is conveyed in the forward direction F along the conveying path Q. A tank 20 provided inside the casing 2 supplies the liquid G to the printing unit 6 via a tube (not shown).

The third conveying unit 15 is disposed beneath the printing unit 6 and downstream of the second conveying unit 7 in the forward direction F. The third conveying unit 15 conveys the continuous medium M in both the forward direction F and reverse direction B. The third conveying unit 15 is provided with a drive roller 13, a follow roller 14, and an endless belt 16. The drive roller 13 and follow roller 14 are separated from each other in the front-rear direction. The endless belt 16 is stretched around the drive roller 13 and follow roller 14. When the drive roller 13 rotates, the endless belt 16 circulates, and the follow roller 14 rotates along with the circulation of the endless belt 16. The outer surface on the top of the endless belt 16 opposes the nozzles 6a of the printing unit 6 at substantially the same vertical position as the area in which the second conveying unit 7 nips the continuous medium M. The outer surface on the top of the endless belt 16 supports the continuous medium M from below and conveys the continuous medium M in conveying directions between the second conveying unit 7 and the fourth conveying unit 19.

The fixing unit 40 is disposed downstream of the printing unit 6 in the forward direction F and upstream of the reading unit 45 in the forward direction F. The fixing unit 40 is a halogen heater that possesses a halogen lamp 41, a reflector 42, and a housing 43. An opening 44 extending in the left-right direction is formed in the bottom wall of the housing 43. The fixing unit 40 radiates infrared light through the opening 44 to heat the continuous medium M passing directly beneath the opening 44. The radiated infrared fixes the liquid G to the print labels L in the continuous medium M after the printing unit 6 ejects the liquid G onto the print labels L.

The fourth conveying unit 19 is disposed downstream of the printing unit 6 and fixing unit 40 in the forward direction F and upstream of the reading unit 45 in the forward direction F. The fourth conveying unit 19 conveys the continuous medium M in both the forward direction F and reverse direction B. The fourth conveying unit 19 has a conveying roller 17 that rotates about an axis extending in the left-right direction, and a pinch roller 18 disposed below the conveying roller 17. The fourth conveying unit 19 conveys the continuous medium M while the continuous medium M is nipped from above and below by the conveying roller 17 and pinch roller 18.

The reading unit 45 is disposed above the conveying path Q at a position downstream of the printing unit 6 and fixing unit 40 in the forward direction F and upstream of the discharge port 21 in the forward direction F. The reading unit 45 reads images representing content that have been printed on the print labels L by the printing unit 6 and outputs data of the read images to a control unit 30 described later.

The fifth conveying unit 48 is disposed downstream of the reading unit 45 in the forward direction F and upstream of the cutting unit 50 in the forward direction F. The fifth conveying unit 48 conveys the continuous medium M in both the forward direction F and the reverse direction B. The fifth conveying unit 48 has a conveying roller 46 that rotates about an axis extending in the left-right direction, and a pinch roller 47 disposed below the conveying roller 46. The fifth conveying unit 48 conveys the continuous medium M while the continuous medium M is nipped from above and below by the conveying roller 46 and pinch roller 47.

The cutting unit 50 is disposed downstream of the reading unit 45 and fifth conveying unit 48 in the forward direction F and upstream of the discharge port 21 in the forward direction F. The cutting unit 50 is provided with a blade 50a that extends downward, and a drive unit (not shown). The drive unit is a motor, for example. The drive force of the drive unit drives the blade 50a. When driven, the blade 50a cuts one or a plurality of print labels L from the continuous medium M at substantially the same position as the discharge port 21. The one or plurality of print labels L cut from the continuous medium M are discharged through the discharge port 21. Note that the continuous medium M may be cut through a manual operation by the user instead.

The external device connector 242 is arranged in the lower-right section of the front wall 24 configuring the casing 2. The external device connector 242 is a connector for electrically connecting the printing device 1 to an external information device, such as a PC.

Figure 3:
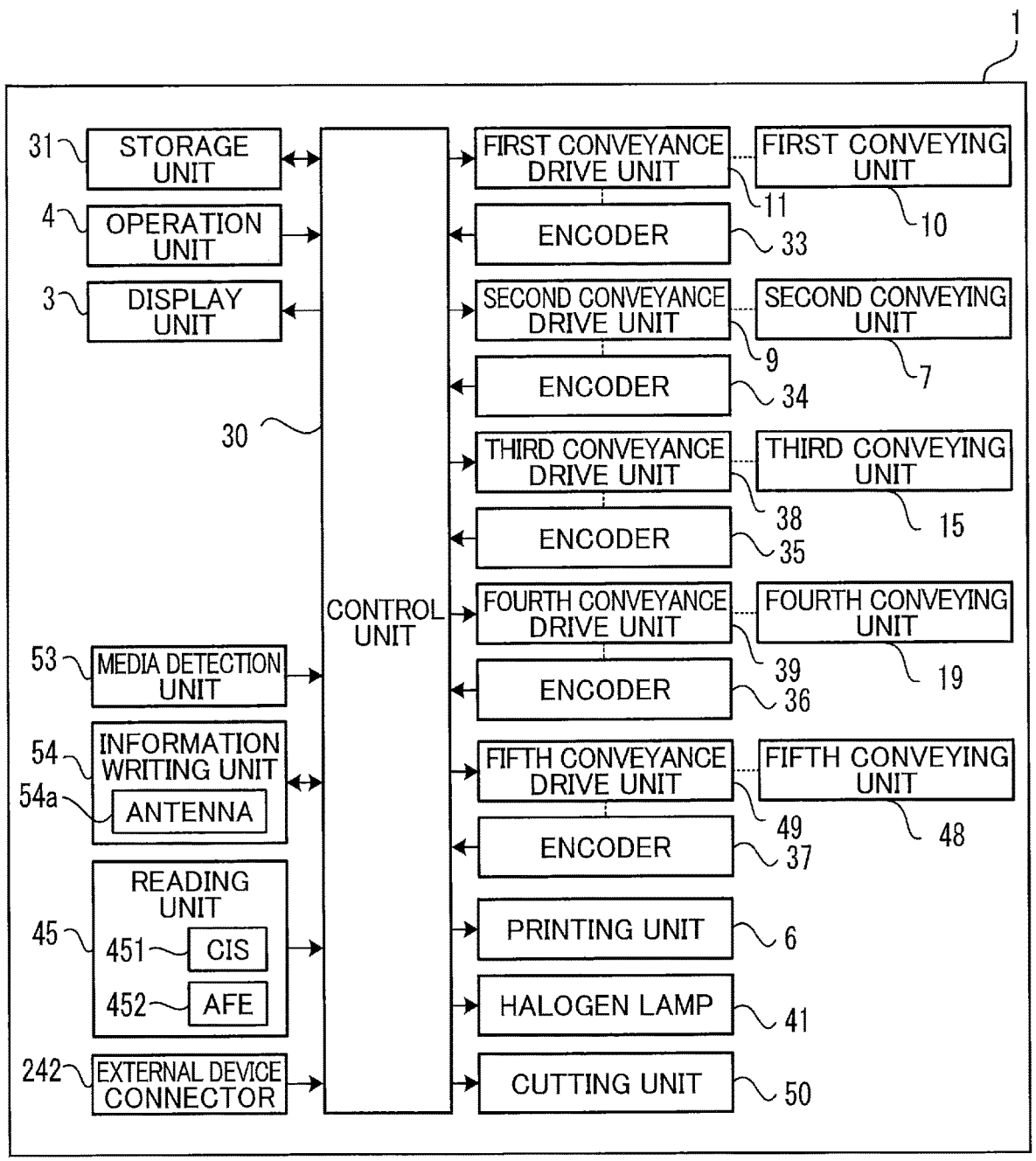
FIG. 3 is a block diagram illustrating an electrical configuration of the printing device.

Next, the electrical configuration of the printing device 1 will be described with reference to FIG. 3. The printing device 1 is provided with a control unit 30. Electrically connected to the control unit 30 and provided in the printing device 1 are the operation unit 4, display unit 3, printing unit 6, halogen lamp 41, cutting unit 50, media detection unit 53, information writing unit 54, reading unit 45, and external device connector 242 described above, as well as a storage unit 31, a first conveyance drive unit 11, a second conveyance drive unit 9, a third conveyance drive unit 38, a fourth conveyance drive unit 39, a fifth conveyance drive unit 49, and encoders 33, 34, 35, 36, and 37.

The control unit 30 is provided with a CPU that performs overall control of the printing device 1. The control unit 30 includes prescribed electrical circuits and the like that transmit drive signals (e.g., drive currents) to the printing unit 6, halogen lamp 41, cutting unit 50, first conveyance drive unit 11, second conveyance drive unit 9, third conveyance drive unit 38, fourth conveyance drive unit 39, fifth conveyance drive unit 49, and cutting unit 50 in response to commands from the CPU.

The storage unit 31 includes a ROM, a RAM, a flash memory, and the like for storing various parameters and the like required when the control unit 30 executes various programs. The storage unit 31 stores a program for controlling the control unit 30 to execute a printing process described later in FIGS. 5, 9, 11, and 12. By developing the program stored in the storage unit 31, the control unit 30 functions as an example of a processor for executing the printing process.

The first conveyance drive unit 11 drives the first conveying unit 10 to rotate. The first conveyance drive unit 11 is a stepping motor, for example, capable of forward and reverse rotation. The second conveyance drive unit 9 drives the second conveying unit 7 to rotate. The second conveyance drive unit 9 is also a stepping motor, for example, capable of forward and reverse rotation. The third conveyance drive unit 38 drives the third conveying unit 15 to rotate. The third conveyance drive unit 38 is a stepping motor, for example, capable of forward and reverse rotation. The fourth conveyance drive unit 39 drives the fourth conveying unit 19 to rotate. The fourth conveyance drive unit 39 is a stepping motor, for example, capable of forward and reverse rotation. The fifth conveyance drive unit 49 drives the fifth conveying unit 48 to rotate. The fifth conveyance drive unit 49 is also a stepping motor, for example, capable of forward and reverse rotation.

The encoder 33 inputs a value corresponding to the drive amount of the first conveyance drive unit 11 into the control unit 30. The encoder 34 inputs a value corresponding to the drive amount of the second conveyance drive unit 9 into the control unit 30. The encoder 35 inputs a value corresponding to the drive amount of the third conveyance drive unit 38 into the control unit 30. The encoder 36 inputs a value corresponding to the drive amount of the fourth conveyance drive unit 39 into the control unit 30. The encoder 37 inputs a value corresponding to the drive amount of the fifth conveyance drive unit 49 into the control unit 30. Below, the first conveyance drive unit 11, second conveyance drive unit 9, third conveyance drive unit 38, fourth conveyance drive unit 39, and fifth conveyance drive unit 49 will collectively be referred to as simply the conveyance drive units.

The media detection unit 53 inputs detection results into the control unit 30 indicating whether the leading edge of the continuous medium M has been detected. The information writing unit 54 reads information from and writes information to RFID tags T provided on print labels L via the antenna 54a. The information writing unit 54 inputs information read from RFID tags T into the control unit 30. The information writing unit 54 writes information to RFID tags T in response to commands from CPU of the control unit 30. The reading unit 45 is provided with a contact image sensor (CIS) 451, and an analog front-end (AFE) 452. The CIS 451 reads the image printed on each of the print labels L. The AFE 452 converts the analog image read by the CIS 451 to digital image data. The reading unit 45 inputs the converted image data into the control unit 30. The external device connector 242 functions as an input/output interface for exchanging information with an external information device, such as a PC.

Next, a database 80 will be described with reference to FIG. 4. In the present embodiment, a database 80 is stored on a PC (not shown) that is connected to the printing device 1 via the external device connector 242. The database 80 stores a plurality of sets of code image information for a plurality of code images to be printed on print labels L and a plurality of sets of prescribed information to be written to RFID tags T provided on the print labels L in a printing process described later.

The code images in the present embodiment are images of one-dimensional codes representing encoded information. In the present embodiment, the one-dimensional code images are barcode images. The code image information is print data for printing the code images on print labels L. The prescribed information to be written to the RFID tags T is 8-digit decimal numbers. The database 80 stores the code image information and prescribed information in association with each of the serial numbers "A001", "A002", . . . listed under the "No." column.

In this embodiment, a serial number and a code image corresponding to code image information associated with that serial number are printed on each print label L. The serial number and code image to be printed on a print label L will be collectively referred to as the prescribed image in the following description. Print labels L printed with prescribed images are affixed to certain products, for example, for use in product management and the like. Serial numbers are listed in the database 80 in ascending order, such as the order No. A001, No. A002, No. A003, . . . , to correspond with the production order of the product. The code images in the present embodiment are images encoding various information related to the products, such as the manufacturer of the product and the time of manufacture. The prescribed information is a numerical representation of various product-related information.

When the print labels L are affixed to certain products with the aim of using their printed code images for the aforementioned product management or the like, the person managing the products employs a barcode reader or the like to scan the code images. Consequently, code images must be printed on print labels L with sufficient printing quality to be read accurately by the barcode reader or the like.

Figure 5:
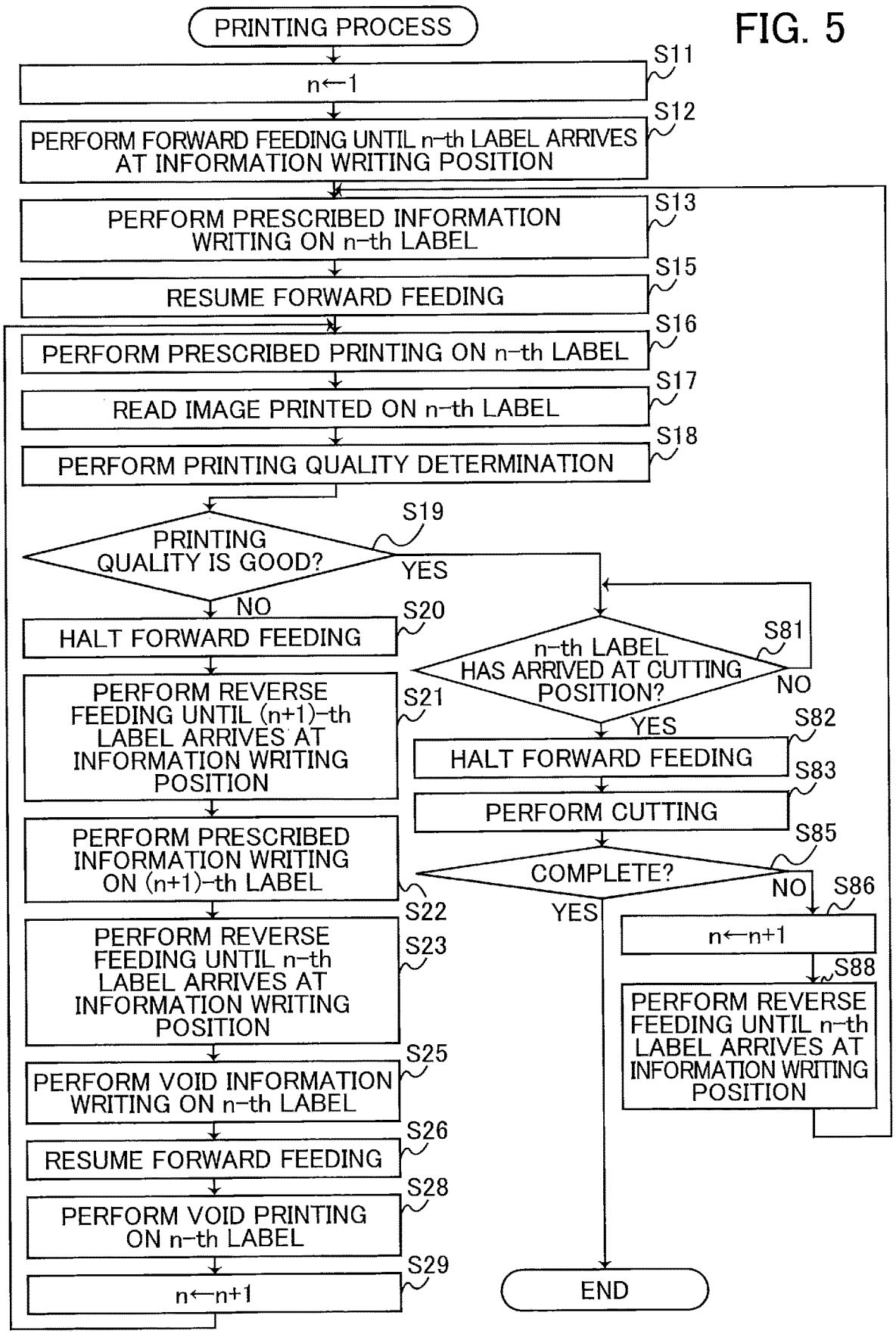
FIG. 5 is a flowchart illustrating steps in a printing process executed by a controller of the printing device in one embodiment.

Next, the printing process executed by the control unit 30 of the printing device 1 will be described with reference to FIG. 5. The control unit 30 executes the printing process when detecting a command to print prescribed information on the print label L. In the present embodiment, a user issues a command to print prescribed information via the operation unit 4. In the following description, "step" is abbreviated as "S" in the notation for each process given in the flowcharts. At the start of the printing process, the continuous medium M is nipped in the second conveying unit 7.

In S11 at the beginning of the printing process, the control unit 30 increments the value of a variable n by one. The variable n is used to define what item of (i.e., what number of) prescribed information in the database 80 to reference. The value for the variable n is stored in the storage unit 31, and the control unit 30 updates the stored value after incrementing the value for n. The initial value of n is zero at the start of the printing process. Hence, n is set to one after being incremented in S11 to identify the print label L arranged farthest downstream on the continuous medium M in the forward direction F at the beginning of the printing process.

In S12 the control unit 30 begins conveying the continuous medium M in the forward direction F until the print label L associated with n=1 (i.e., the n-th print label L associated with n=1) is in the position on the conveying path Q at which the information writing unit 54 is disposed. Hereinafter, conveying the continuous medium M in the forward direction F will be called forward feeding. The control unit 30 controls the drive amount of the conveyance drive units based on when the media detection unit 53 detects the leading edge of the continuous medium M. Through this control, the control unit 30 conveys each of the print labels L arranged on the continuous medium M to prescribed positions. The control unit 30 continues feeding the continuous medium M forward until the print label L (the n-th print label L) associated with n=1 has arrived at the position on the conveying path Q at which the antenna 54a of the information writing unit 54 is located. When the print label L (the n-th print label L) associated with n=1 arrives at this position, the control unit 30 halts forward feeding of the continuous medium M.

Figure 6:
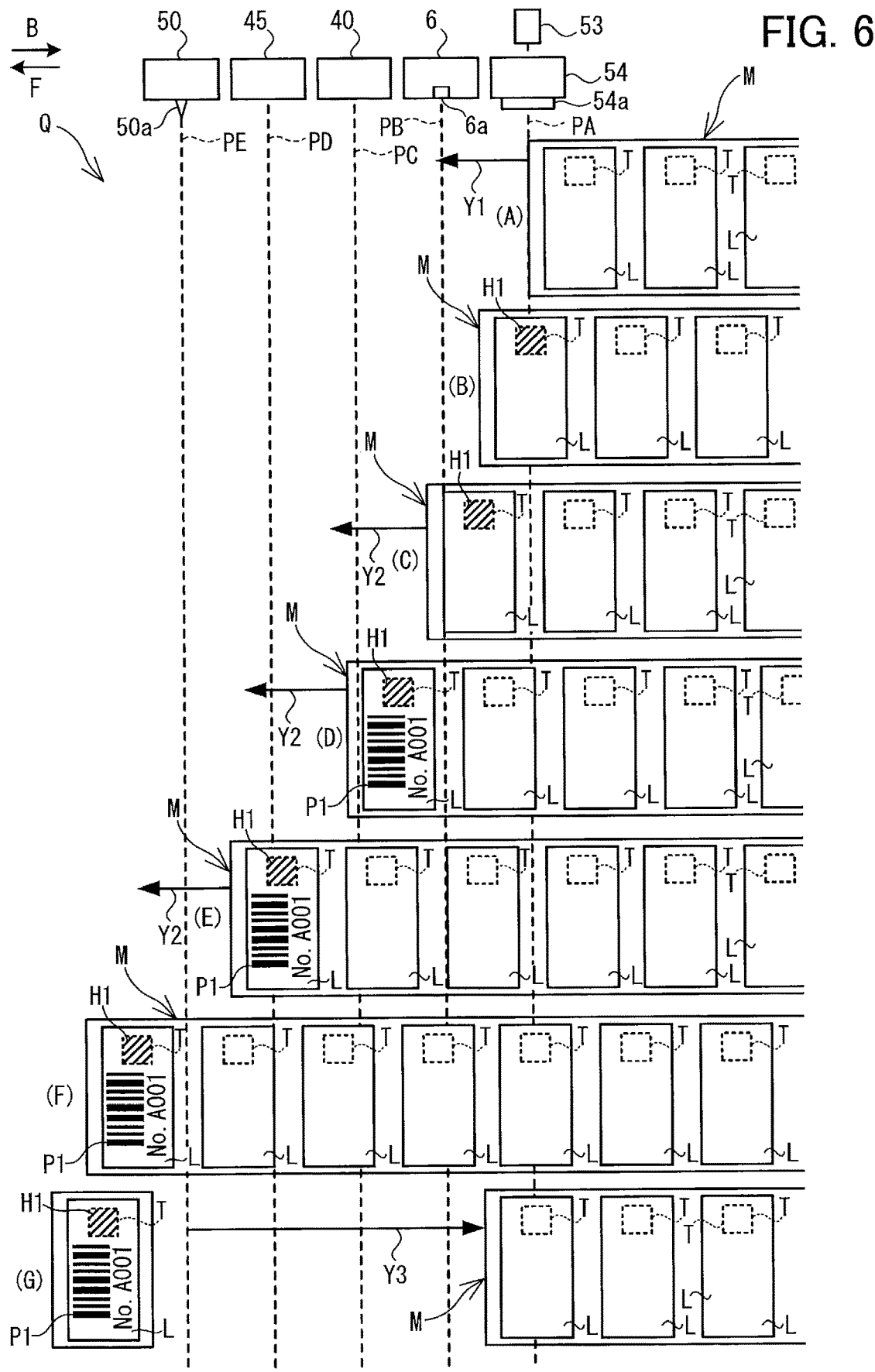
FIG. 6 is an explanatory diagram illustrating examples of a continuous medium on which the printing process shown in FIG. 5 is being performed in one embodiment.
Figure 7:
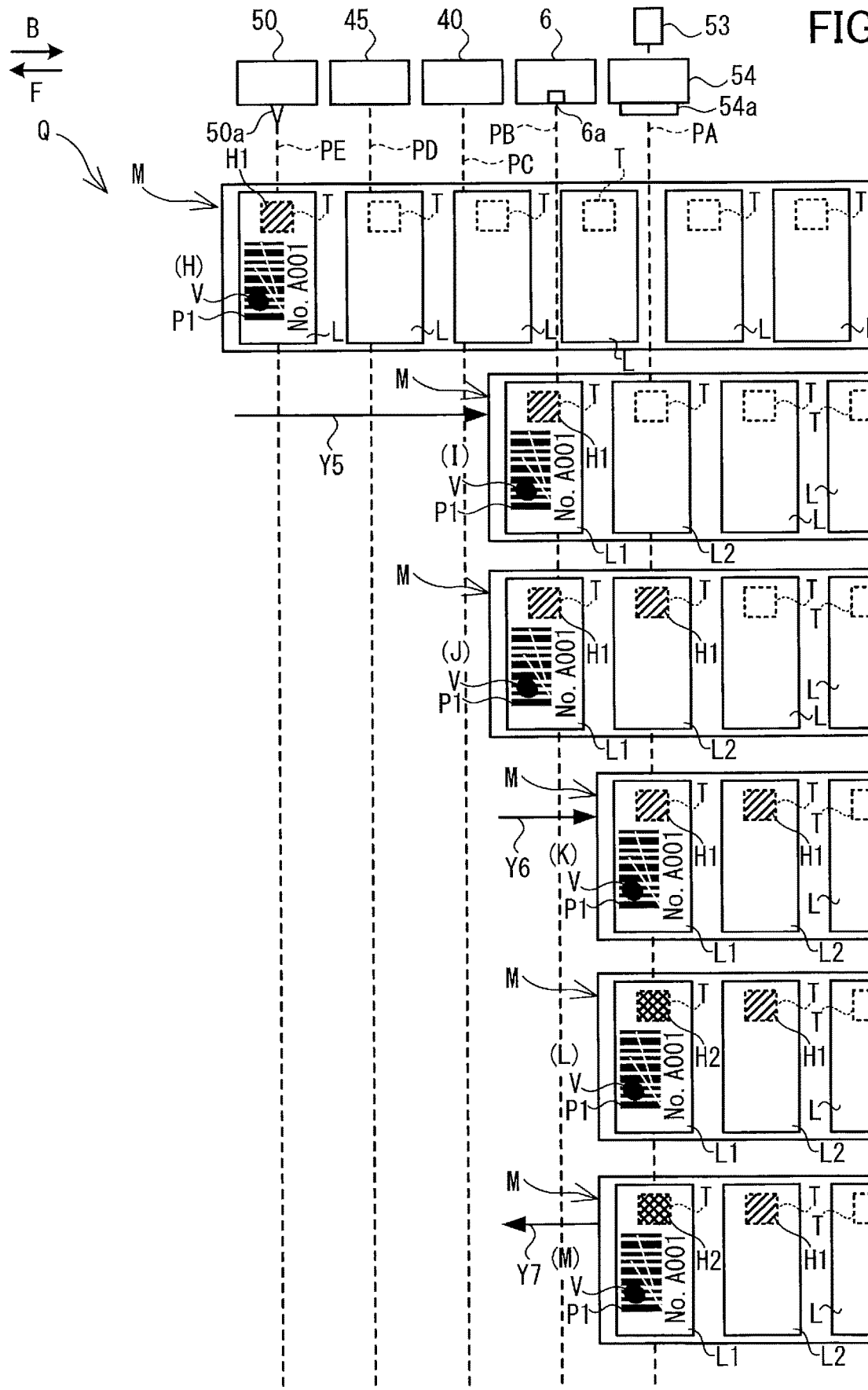
FIG. 7 is an explanatory diagram illustrating examples of the continuous medium on which the printing process shown in FIG. 5 is being performed in one embodiment and is a continuation of FIG. 6.
Figure 8:
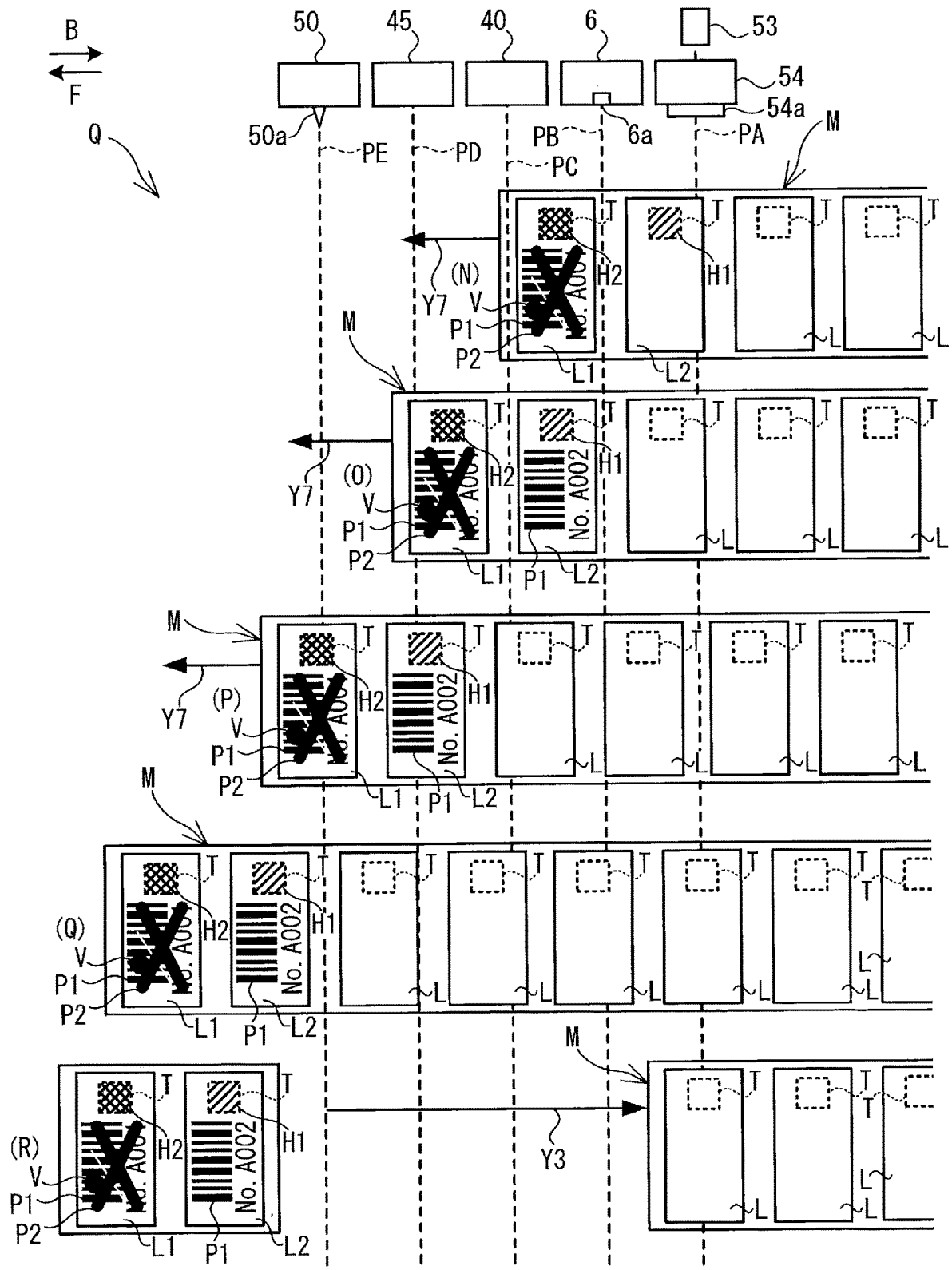
FIG. 8 is an explanatory diagram illustrating examples of the continuous medium on which the printing process shown in FIG. 5 is being performed in one embodiment and is a continuation of FIG. 7.

FIGS. 6 through 8 illustrate examples of printing processes in which printing is performed on print labels L and writing of information is performed to the RFID tags T furnished on the print labels L. In FIGS. 6 through 8, the position on the conveying path Q corresponding to the center of the antenna 54a in the conveying direction will be called an information writing position PA. The information writing position PA is the position at which the information writing unit 54 writes electronic information to RFID tags T provided on print labels L. In the present embodiment, the information writing position PA is aligned with the position on the conveying path Q at which the media detection unit 53 is disposed, i.e., the position at which the media detection unit 53 detects the leading edge of the continuous medium M passing as the continuous medium M is fed forward. However, this arrangement of the information writing position PA and the position at which the media detection unit 53 detects the leading edge of the continuous medium M is merely one example, and the present disclosure is not limited to this arrangement.

The position on the conveying path Q at which the nozzles 6a of the printing unit 6 are disposed will be called the printing position PB. The printing position PB is the position at which the printing unit 6 begins printing the print label L. The position on the conveying path Q at which the fixing unit 40 is disposed will be called the fixing position PC. The fixing position PC is the position at which the image printed on the print label L is fixed to the print label L through heating by the fixing unit 40. The position on the conveying path Q at which the reading unit 45 is disposed will be called the reading position PD. The reading position PD is the position at which the reading unit 45 begins reading the image printed on the print label L. The position on the conveying path Q at which the blade 50a of the cutting unit 50 is disposed will be called the cutting position PE. The cutting position PE on the conveying path Q is approximately the same position as the discharge port 21.

In the process of S12, the control unit 30 begins feeding the continuous medium M forward, as indicated by arrow Y1 in Part (A) of FIG. 6. Part (A) of FIG. 6 shows the state in which the media detection unit 53 detects the leading edge of the continuous medium M being fed forward. From this state, the control unit 30 continued feeding the continuous medium M forward. The print label L arranged farthest downstream on the continuous medium M in the forward direction F is at the information writing position PA when the center portion in the conveying direction of the RFID tag T provided on the print label L is at the same position in the conveying direction as the information writing position PA. The control unit 30 halts forward feeding of the continuous medium M when the n-th print label L, i.e., the print label L arranged farthest downstream on the continuous medium M in the forward direction F, has arrived at the information writing position PA. Accordingly, the RFID tag T provided in the n-th print label L is halted at the information writing position PA.

In S13 the control unit 30 writes prescribed information to the RFID tag T provided on the n-th print label L, which is at the information writing position PA. Hereinafter, the writing of prescribed information to an RFID tag T provided on a print label L will be called prescribed information writing. In this process, the control unit 30 acquires the prescribed information to be written to the n-th print label L from the database 80 and transmits the acquired prescribed information to the information writing unit 54. Since n=1 in this case, the control unit 30 acquires the value "42059179", which is the prescribed information associated with No. A001 stored at the top of the database 80, i.e., stored as the first item of the database 80, and transmits this acquired value to the information writing unit 54 as the prescribed information. The information writing unit 54 receives the prescribed information and transmits radio waves from the antenna 54a for writing this prescribed information to the RFID tag T. Each RFID tag T is provided with an antenna for receiving and transmitting radio waves, and a microchip with a memory for storing electronic information. When the RFID tag T receives radio waves transmitted from the antenna 54a via its antenna, the RFID tag T writes the prescribed information represented by the radio waves to its microchip. In other words, prescribed information writing is performed. After completing the prescribed information writing, the RFID tag T transmits radio waves from the antenna indicating that the prescribed information writing is complete. Upon receiving radio waves transmitted from the RFID tag T, the information writing unit 54 determines that prescribed information writing for the RFID tag T has been completed. Part (B) of FIG. 6 shows the RFID tag T provided on the print label L arranged farthest downstream on the continuous medium M in the forward direction F after prescribed information writing has been executed. Hereinafter, an RFID tag T to which prescribed information writing has been executed is depicted with hatching H1, as indicated in Part (B) of FIG. 6.

In S15 the control unit 30 resumes feeding the continuous medium M forward. Part (C) of FIG. 6 shows the state in which the n-th print label L has reached the printing position PB after the control unit 30 began feeding the continuous medium M forward in S15. Hereinafter, forward feeding of the continuous medium M initiated in S15 is indicated by the arrow Y2, as shown in Part (C) of FIG. 6.

In S16 the control unit 30 prints the prescribed image on the n-th print label L that has arrived at the printing position PB. In this process, the control unit 30 acquires the serial number and code image information for writing to the n-th print label L from the database 80 and prints a prescribed image based on the acquired serial number and code image information on the n-th print label L. Hereinafter, the prescribed image printed on the print label L will be denoted as a prescribed image P1. Further, printing the prescribed image P1 on the print label L will be called prescribed printing. Part (D) of FIG. 6 shows the state of the print label L associated with n=1 after being printed with a prescribed image P1 that includes the serial number No. A001 associated with n=1 and the code image corresponding to the code image information associated with serial number No. A001. At this time, the control unit 30 continues feeding the continuous medium M forward, as indicated by the arrow Y2. Therefore, after the prescribed printing is executed, the n-th print label L passes through the fixing position PC, where the prescribed image P1 is fixed to the n-th print label L.

In S17 the control unit 30 controls the reading unit 45 to read the prescribed image P1 printed on the n-th print label L, which has arrived at the reading position PD, and acquires the reading results of reading the prescribed image P1 from the reading unit 45. Based on the acquired reading results, in S18 the control unit 30 determines whether the prescribed image P1 printed on the n-th print label L is of good printing quality. This determination of printing quality for the prescribed image P1 made by the control unit 30 will be called a printing quality determination. The control unit 30 executes the printing quality determination in particular to determine whether the printing quality of the code image included in the prescribed image P1 is sufficient. If the reading results acquired from the reading unit 45 indicate that problems occurred during printing, such as the code image being smudged or blurred, the control unit 30 determines in the printing quality determination that the quality of printing is poor. When the control unit 30 determines in the printing quality determination that the printing quality is not poor, the control unit 30 assumes that the printing quality is good. The printing quality determination is made based on prescribed criteria used for determining the printing quality of a code image. Prescribed criteria may be stored in the storage unit 31 in advance or may be acquired from an external device via the external device connector 242. The control unit 30 performs the processes in S17 and S18 while continuing to feed the continuous medium M forward, as indicated by arrow Y2 in Part (E) of FIG. 6. Part (E) of FIG. 6 illustrates the process in which the reading unit 45 reads the prescribed image P1 printed on the n-th print label L. The printing quality of the prescribed image P1 printed on the n-th print label L in the example of Part (E) of FIG. 6 is assumed to be good.

In S19 the control unit 30 determines whether the results of the printing quality determination indicate a good printing quality for the prescribed image P1. If the results of the printing quality determination indicate a good printing quality for the prescribed image P1 (S19: YES), in S81 the control unit 30 determines whether the n-th print label L has arrived at the cutting position PE. The control unit 30 determines that the n-th print label L has arrived at the cutting position PE when the upstream side of the n-th print label L in the forward direction F reaches the cutting position PE while the control unit 30 continues to feed the continuous medium M forward, as illustrated in Part (F) of FIG. 6. If the n-th print label L has not yet arrived at the cutting position PE (S81: NO), the control unit 30 repeatedly performs the determination in S81 while continuing the forward feeding. When the n-th print label L has arrived at the cutting position PE (S81: YES), in S82 the control unit 30 halts forward feeding. In S83 the control unit 30 controls the cutting unit 50 to cut the continuous medium M, thereby cutting off the n-th print label L from the continuous medium M, as illustrated in Part (G) of FIG. 6.

In S85 the control unit 30 determines whether the printing process is complete. The control unit 30 determines that the printing process is finished when printing of prescribed images P1 on the scheduled number of print labels L is complete or when a command to quit printing has been inputted into the control unit 30 via the operation unit 4, for example. If the control unit 30 determines that the printing process is complete (S85: YES), the control unit 30 ends the printing process. However, if the control unit 30 determines that the printing process is not complete (S85: NO), in S86 the control unit 30 increments the value of n by one and updates the stored value for the variable n.

In S88 the control unit 30 conveys the continuous medium M in the reverse direction B in order to convey the print label L newly designated as the n-th print label L, i.e., the print label L arranged farthest downstream on the continuous medium M in the forward direction F after executing the cutting process of S83, to the information writing position PA. Hereinafter, conveying the continuous medium M in the reverse direction B will be called reverse feeding. As indicated by arrow Y3 in Part (G) of FIG. 6, the continuous medium M is reverse fed until the RFID tag T provided on the print label L that is newly designated as the n-th print label and is currently arranged on the continuous medium M farthest downstream in the forward direction F has arrived at the information writing position PA. When the RFID tag T furnished on the n-th print label L arrives at the information writing position PA, the control unit 30 halts reverse feeding of the continuous medium M. Thereafter, the control unit 30 executes the same sequence of steps from S13.

On the other hand, if the results of the printing quality determination indicate that the printing quality of the prescribed image P1 is not good, i.e., that the printing quality of the prescribed image P1 is poor (S19: NO), in S20 the control unit 30 halts forward feeding of the continuous medium M. In the example of Part (H) of FIG. 7, a print defect V that includes a smudged or blurred code image has been produced in the prescribed image P1 printed on the n-th print label L, resulting in poor printing quality. As a consequence, the control unit 30 halts forward feeding of the continuous medium M in the process of S20.

In S21 the control unit 30 feeds the continuous medium M in reverse until the (n+1)-th print label L arranged next to the n-th print label L reaches the information writing position PA. In Part (I) of FIG. 7, the n-th print label L whose prescribed image P1 has poor printing quality if denoted as a first-type label L1, and the (n+1)-th print label L, i.e., the print label L arranged adjacent to the first-type label L1 on the upstream side in the forward direction F, is denoted as a second-type label L2. In the process of S21, the continuous medium M is reverse fed, as indicated by arrow Y5, until the second-type label L2 has reached the information writing position PA. When the RFID tag T furnished on the second-type label L2 arrives at the information writing position PA, the control unit 30 halts reverse feeding of the continuous medium M.

In S22 the control unit 30 executes prescribed information writing to the RFID tag T furnished on the (n+1)-th print label L disposed at the information writing position PA, i.e., the second-type label L2. In this process, the control unit 30 acquires the prescribed information stored as the (n+1)-th item of the database 80, that is, the prescribed information to be written to the (n+1)-th print label L from the database 80, and transmits this acquired prescribed information to the information writing unit 54. The information writing unit 54 writes the acquired prescribed information to the RFID tag T furnished on the (n+1)-th print label L, i.e., the second-type label L2. Thus, the RFID tag T on the second-type label L2 subjected to the prescribed information writing is depicted with hatching H1 in Part (J) of FIG. 7.

In S23 the control unit 30 feeds the continuous medium M in reverse until the n-th print label L, i.e., the first-type label L1, reaches the information writing position PA. In this process, the continuous medium M is reverse fed, as indicated by arrow Y6 in Part (L) of FIG. 7, until the first-type label L1 arrives at the information writing position PA. Once the RFID tag T furnished on the first-type label L1 has reached the information writing position PA, the control unit 30 halts reverse feeding of the continuous medium M.

In S25 the control unit 30 writes void information to the RFID tag T furnished on the n-th print label L disposed in the information writing position PA, i.e., the first-type print label L1. Hereinafter, the writing of void information to an RFID tag T provided on a print label L will be called void information writing. Void information is stored in the storage unit 31 together with data for the program used to execute the printing process. The void information is used for cases in which a print defect V occurs in a prescribed image P1 printed on a first-type label L1. In the present embodiment, the void information numerically indicates that the prescribed information stored in the RFID tag T is invalid. Hereinafter, an RFID tag T that has undergone void information writing is depicted with cross-hatching H2, as illustrated in Part (L) of FIG. 7.

In S26 the control unit 30 begins feeding the continuous medium M forward. Part (M) of FIG. 7 depicts the state in which the control unit 30 has resumed forward feeding of the continuous medium M in the process of S26. Forward feeding of the continuous medium M initiated in S26 will be depicted by arrow Y7, as illustrated in Part (M) of FIG. 7. In S28 the control unit 30 prints a void image P2 illustrated in Part (N) of FIG. 8 on the n-th print label L that has arrived at the printing position PB as the continuous medium M has been fed forward, i.e., on the first-type label L1. In this example, the void image P2 is an image depicting an "X" to indicate that the printing quality is poor. The void image P2 is printed over the top of the prescribed image P1. Hereinafter, printing of the void image P2 on the printing device 1 will be called void printing. By executing void printing, the printing device 1 can clearly indicate that image quality of the prescribed image P1 on the first-type label L1 is poor. In this state, the control unit 30 continues feeding the continuous medium M forward, as indicated by arrow Y7 in Part (N) of FIG. 8. Accordingly, the first-type label L1 that has just undergone void printing passes the fixing position PC, where the void image P2 is fixed to the first-type label L1.

In S29 the control unit 30 increments the value of n by one and updates the stored value. In other words, from this point the control unit 30 begins treating the second-type label L2, which was the (n+1)-th print label L, as the new n-th print label L. Subsequently, the process returns to S16, where the control unit 30 executes a printing process on the second-type label L2, which is the new n-th print label L. As illustrated in Part (O) of FIG. 8, the control unit 30 prints a prescribed image P1 that includes the serial number No. A002 corresponding to n=2 and the code image corresponding to the code image information associated with the serial number No. A002 on the n-th print label L, i.e., the second-type label L2. At this time, the control unit 30 continues feeding the continuous medium M forward, as indicated by arrow Y7 in Part (N) of FIG. 8. Accordingly, the second-type label L2 passes the fixing position PC, where the prescribed image P1 is fixed to the second-type label L2.

Once the second-type label L2 constituting the new n-th print label L has arrived at the reading position PD, in S17 the control unit 30 controls the reading unit 45 to read the prescribed image P1 printed on the second-type label L2, which is the new n-th print label L, and acquires reading results for the prescribed image P1 from the reading unit 45. In S18 the control unit 30 performs a printing quality determination on the prescribed image P1 printed on the second-type label L2 constituting the new n-th print label L based on the acquired reading results. As shown in Part (P) of FIG. 8, the processes in S17 and S17 are performed while the control unit 30 continues feeding the continuous medium M forward, as indicated by arrow Y7. In the example of Part (P) of FIG. 8, it is assumed that the prescribed image P1 printed on the second-type label L2 constituting the new n-th print label L has no print defects V and, hence, the printing quality if good.

In S19 the control unit 30 determines whether the results of the printing quality determination indicate that the printing quality of the prescribed image P1 is good. When the results of the printing quality determination indicate that printing quality of the prescribed image P1 is good (S19: YES), in S81 the control unit 30 determines whether the second-type label L2 constituting the new n-th print label L has arrived at the cutting position PE. While the second-type label L2 constituting the new n-th print label L has not yet arrived at the cutting position PE (S81: NO), the control unit 30 repeats the determination in S81 while continuing the forward feed. Once the second-type label L2 constituting the new n-th print label L has reached the cutting position PE (S81: YES), in S82 the control unit 30 halts forward feeding. Part (Q) of FIG. 8 shows the state of the continuous medium M after forward feeding was halted because the second-type label L2 constituting the new n-th print label L arrived at the cutting position PE. In S83 the control unit 30 controls the cutting unit 50 to cut the continuous medium M. As a result, a total of two print labels L, including the first-type label L1 and second-type label L2, are cut off the continuous medium M, as illustrated in Part (R) of FIG. 8. Accordingly, the printing device 1 can separate the first-type label L1 and second-type label L2 from the continuous medium M while facilitating the user in identifying that the printing quality of the first-type label L1 is of poor quality.

Thereafter, the control unit 30 performs the determination in S85. If the control unit 30 determines that the printing process is complete (S85: YES), the control unit 30 ends the printing process. If the control unit 30 determines that the printing process is not complete (S85: NO), the control unit 30 increments the value of n by one and updates the stored value. In other words, the control unit 30 sets the print label L currently arranged farthest downstream on the continuous medium M in the forward direction F as the new n-th print label L. In S88 the control unit 30 conveys the continuous medium M in the reverse direction B in order to convey the print label L newly designated as the n-th print label L to the information writing position PA, as indicated by arrow Y3 in Part (R) of FIG. 8. Subsequently, the process returns to S13. Part (R) of FIG. 8 shows the state of the continuous medium M after having been reverse fed until the RFID tag T provided on the print label L currently arranged farthest downstream on the continuous label L in the forward direction F, i.e., the new n-th print label L, has reached the information writing position PA.

Note that if the results of the printing quality determination in S19 for the second-type label L2 constituting the new n-th print label L indicate poor printing quality for the prescribed image P1 (S19: NO), the control unit 30 performs the sequence of steps S20 through S22. That is, the control unit 30 performs prescribed information writing to the RFID tag T furnished on the print label L that is arranged on the continuous medium M upstream of the second-type label L2 in the forward direction F. The control unit 30 further performs steps S23 through S28 in sequence. That is, the control unit 30 sequentially performs void information writing and void printing on the second-type label L2 constituting the new n-th print label L whose printing quality is poor. Subsequently, the control unit 30 increments n by one in S29, and the process returns to S16.

When a printing defect is produced on a conventional printing device, generally the conventional printing device performs reverse feeding until the print label in question reaches the information writing position. After performing void information writing, the conventional printing device resumes forward feeding while performing a void print. Subsequently, the conventional printing device again performs reverse feeding until the print label following the print label on which the printing defect occurred reaches the information writing position. At this time, the conventional printing device performs prescribed information writing to the RFID tag, after which the device resumes forward feeding and executes prescribed printing. In other words, the conventional printing device feeds the continuous medium in reverse to execute void information writing and void printing on the first-type label, then again feeds the continuous medium in reverse to perform prescribed information writing on another label. Therefore, the conventional printing device has a high frequency of conveyance, and particularly reverse conveyance, for the continuous medium when executing void information writing and void printing.

In contrast, the printing device 1 according to the embodiment performs prescribed information writing on the second-type label L2 prior to performing void information writing and void printing on the first-type label L1. In particular, the printing device 1 performs the prescribed information writing on the second-type label L2 prior to performing void information writing on the first-type label L1. Accordingly, the printing device 1 can perform the prescribed information writing on the second-type label L2 while the first-type label L1 is being reverse fed to the information writing position PA upon determining that the printing quality of the first-type label L1 is poor. Hence, the printing device 1 can reduce the conveyance frequency of the continuous medium M, and particularly the frequency of reverse feeding. Therefore, the printing device 1 can reduce the time required for performing prescribed information writing, prescribed printing, void information writing, and void printing on a plurality of print labels L. Further, the noise generated by the conveyance drive units when conveying the continuous medium M can be loud. However, by reducing the conveyance frequency of the continuous medium M, the printing device 1 can reduce the noise generated by the printing device 1, thereby making the printing device 1 more user-friendly.

As described above, when the printing device 1 determines that the printing quality of a prescribed image P1 printed on a print label L is poor, the printing device 1 executes void printing and void information writing for the print label L. With this action, the printing device 1 clearly indicates that the printing quality of the print label L is poor through the void image P2 printed on the print label L and the void information written to the RFID tag T of the print label L, thereby preventing the print label L from being subsequently used by mistake. In S16 the control unit 30 of the printing device 1 executes prescribed printing on the print label L considered to be in the n-th position (the n-th print label L) on the continuous medium M. In S17 the control unit 30 controls the reading unit 45 to read the prescribed image P1 printed on the print label L, and in S18 executes a printing quality determination based on the reading results. Assuming that a print defect V has occurred on the print label L in the n-th position, this print label L is then designated as the first-type label L1. When the results of the printing quality determination indicate that the printing quality of the prescribed image P1 is poor (S19: NO), in S21 the control unit 30 feeds the continuous medium M in reverse and in S25 executes void information writing to the RFID tag T provided on the first-type label L1. Subsequently, in S26 the control unit 30 begins feeding the continuous medium M forward, and in S28 executes void printing on the first-type label L1. Through this process, in S22 the control unit 30 performs prescribed information writing to the RFID tag T provided on the second-type label L2, which is positioned adjacent to the first-type label L1 on the upstream side in the forward direction F, prior to performing void printing in S28. In other words, the printing device 1 can perform prescribed information writing to the second-type label L2 disposed in the information writing position PA during the course of feeding the first-type label L1 to the information writing position PA in reverse. Accordingly, the printing device 1 of the present embodiment can reduce the number of times the continuous medium M is conveyed, and particularly the frequency of reverse feeding, compared to the conventional technology in which the void printing is executed on the first-type label L1 first and then the second-type label L2 is fed in reverse to the information writing position PA where prescribed information is written to the RFID tag T provided on the second-type label L2. Therefore, the printing device 1 can reduce the time required to write prescribed information and void information to RFID tags T on a plurality of print labels L and to perform prescribed printing and void printing on the print labels L. Further, by reducing the conveyance frequency of the continuous medium M, the printing device 1 can reduce noise generated in the printing device 1.

If the printing quality of the first-type label L1 is poor (S19: NO), in S21 the control unit 30 feeds the continuous medium M in reverse until the second-type label L2 adjacent to the first-type label L1 on the upstream in the forward direction F reaches the information writing position PA. In S22 the control unit 30 executes prescribed information writing to the RFID tag T provided on the second-type label L2, which is disposed at the information writing position PA. Subsequently, in S23 the control unit 30 feeds the first-type label L1 in reverse to the information writing position PA, and in S25 executes void information writing to the RFID tag T provided on the first-type label L1. In S26 the control unit 30 begins feeding the continuous medium M forward and in S28 executes void printing on the first-type label L1.

That is, the control unit 30 executes prescribed information writing to the RFID tag T on the second-type label L2 prior to executing void information writing to the RFID tag T provided on the first-type label L1. This method conveys the continuous medium M in reverse at a lower frequency than a method of performing prescribed information writing on the second-type label L2 after performing void information writing and void printing on the first-type label L1. Therefore, the printing device 1 can further reduce the time required to write prescribed information and void information to RFID tags T provided on a plurality of print labels L and to perform prescribed printing and void printing on the print labels L.

After executing prescribed information writing to the first-type label L1 in S16 and prior to executing void printing on the first-type label L1 in S25, in S22 the control unit 30 executes prescribed information writing to the second-type label L2, which is a single print label L. This method enables the printing device 1 to feed the continuous medium M in reverse fewer times than in the conventional technology.

The printing device 1 is provided with the cutting unit 50, which is disposed on the conveying path Q downstream of the reading unit 45 in the forward direction F. In S83 the control unit 30 controls the cutting unit 50 to cut a total of two print labels L, including the first-type label L1 and second-type label L2, from the continuous medium M. In this way, the printing device 1 can facilitate the user of the printing device 1 to identify a first-type label L1 on which the void image P2 has been printed. Therefore, the printing device 1 can suppress mistaken usage of a first-type label L1 whose prescribed image P1 is of poor printing quality.

The printing device 1 is provided with the fixing unit 40, which is disposed on the conveying path Q downstream of the printing unit 6 in the forward direction F and upstream of the reading unit 45 in the forward direction F. The fixing unit 40 can fix a liquid G to the print label L after the liquid G is ejected on the print label L by the printing unit 6 by heating the print label L while the print label L is fed forward. Since the printing device 1 controls the reading unit 45 to read the image printed on the print label L after the image has been fixed in the fixing unit 40, the printing device 1 can reduce the likelihood of the liquid G adhering to and staining the reading unit 45.

The first conveying unit 10, second conveying unit 7, third conveying unit 15, fourth conveying unit 19, and fifth conveying unit 48 are belts (the endless belt 16) or rollers (the conveying rollers 17, 46, and 71; the pinch rollers 18, 47, and 72; the roll R; the drive roller 13; and the follow roller 14). Therefore, the long continuous medium M is conveyed stably along the conveying path Q. Since the printing unit 6 is an inkjet head, diverse and high quality printing can be performed at higher speeds than when using a thermal head, for example. Since the information writing unit 54 is an RFID reader/writer, the information writing unit 54 can communicate with RFID tags T to smoothly execute prescribed information writing and void information writing. Since the reading unit 45 is provided with the CIS 451, the reading unit 45 can be made more compact than when configured of a CCD image sensor or the like, for example.

The prescribed image P1 that the printing device 1 prints on a print label L includes a code image, which can contain various information.

In the embodiment described above, the printing device 1 is an example of the printing device of the present disclosure. The RFID tag T is an example of the information storage medium of the present disclosure. The plurality of print labels L is an example of the plurality of print media of the present disclosure. The continuous medium M is an example of the continuous medium of the present disclosure. The first conveying unit 10, second conveying unit 7, third conveying unit 15, fourth conveying unit 19, and fifth conveying unit 48 are examples of the conveyor of the present disclosure. The information writing unit 54 is an example of the writer of the present disclosure. The printing unit 6 is an example of the printer of the present disclosure. The reading unit 45 is an example of the reader of the present disclosure. The control unit 30 is an example of the controller of the present disclosure. The process of S13 is an example of the (a) writing of the present disclosure. The process of S16 is an example of the (b) printing of the present disclosure. The process of S18 is an example of the (c) determining of the present disclosure. The process of S21 is an example of the (d) conveying of the present disclosure. The process of S25 is an example of the (e) writing of the present disclosure. The process of S28 is an example of the (f) printing of the present disclosure. The process of S22 is an example of the (g) writing of the present disclosure. The first-type label L1 is an example of the first print medium of the present disclosure. The second-type label L2 is an example of the second print medium of the present disclosure. The prescribed image P1 is an example of the prescribed image of the present disclosure. The void image P2 is an example of the VOID image of the present disclosure. The cutting unit 50 is an example of the cutter of the present disclosure. The fixing unit 40 is an example of the heater of the present disclosure.

Next, a second embodiment of the present disclosure will be described with reference to FIGS. 9 and 10. The control unit 30 in the printing device 1 according to the second embodiment executes the printing process shown in FIG. 9 in place of the printing process of the first embodiment shown in FIG. 5. The remaining configurations of the printing device 1 according to the second embodiment are identical to those in the first embodiment. Similar configurations to the first embodiment will be omitted from the description of the second embodiment accordingly. The printing process shown in FIG. 9 includes similar steps to the printing process of FIG. 5. Accordingly, steps in the printing process of FIG. 9 that are similar to those in the printing process of FIG. 5 are designated with the same step numbers.

Figure 9:
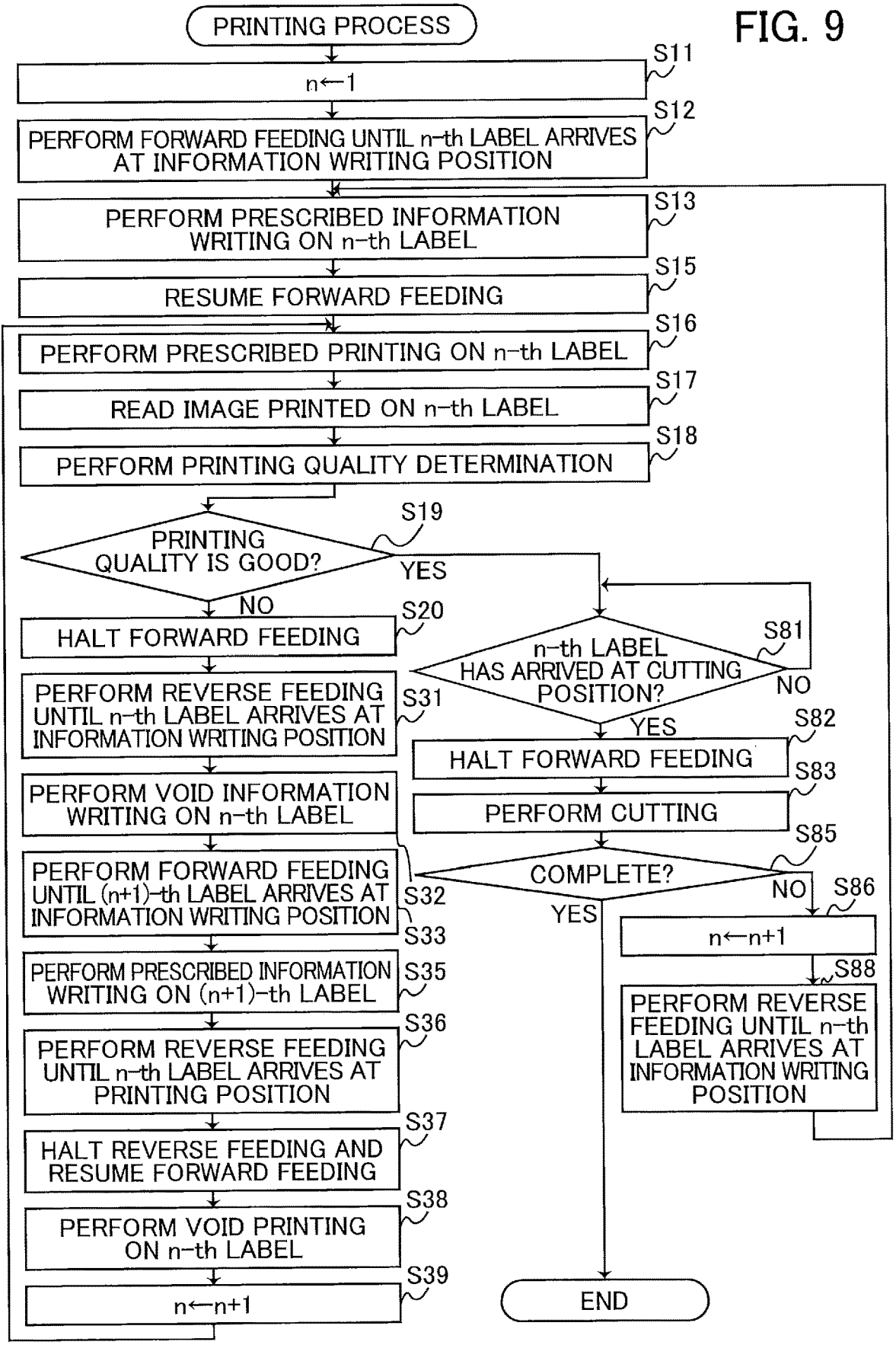
FIG. 9 is a flowchart illustrating steps in a printing process executed by a controller of a printing device in one embodiment.
Figure 10:
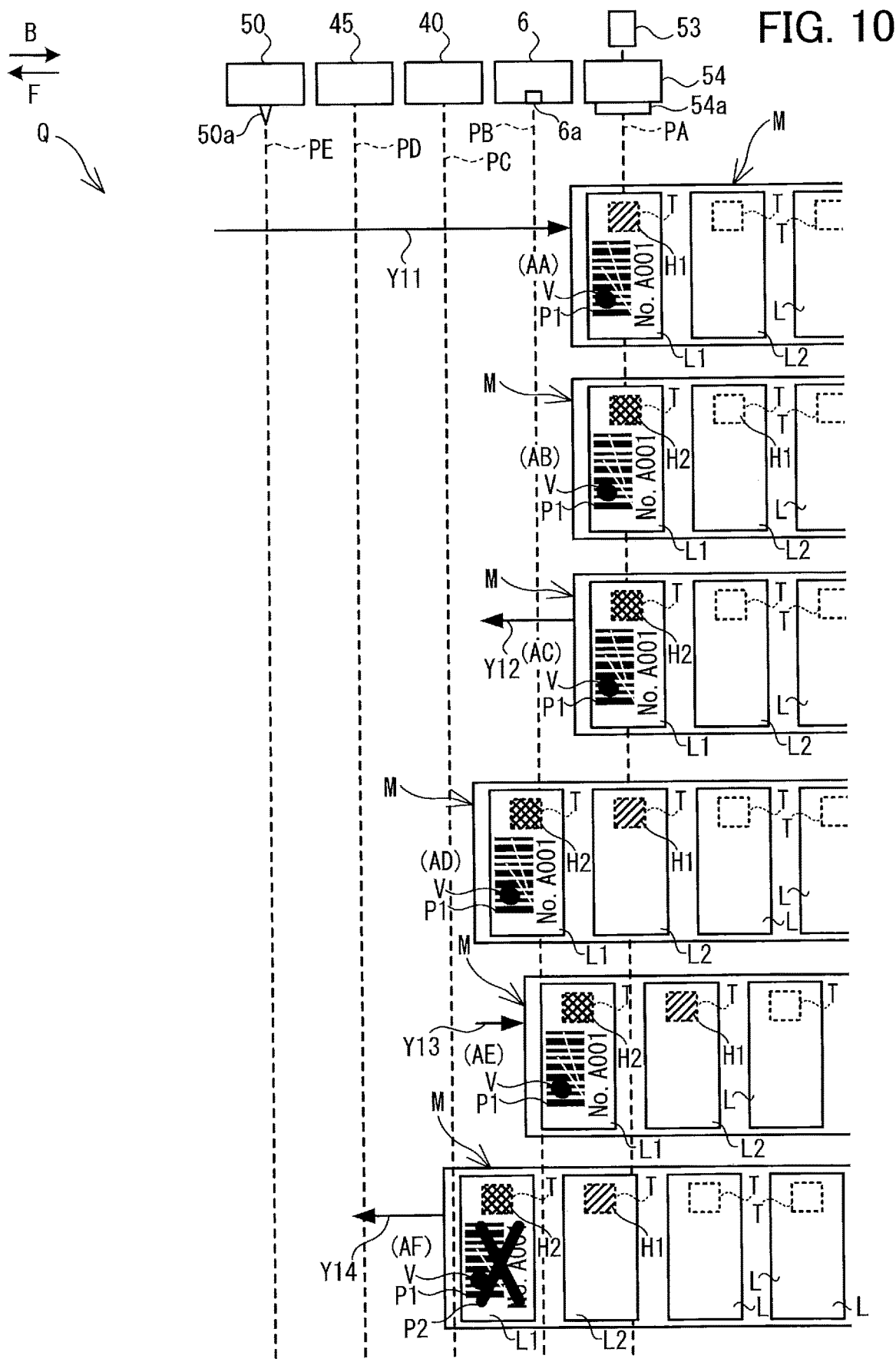
FIG. 10 is an explanatory diagram illustrating examples of a continuous medium on which the printing process shown in FIG. 9 is being performed in one embodiment.

At the beginning of the printing process shown in FIG. 9, the control unit 30 executes the sequence from S11 to S18. A description of these steps has been omitted since they are identical to those in the printing process of FIG. 5. In the following example, the description will be made mainly about a case in which a print defect V is produced in the prescribed image P1 printed on the print label L associated with n=1, which will be called the first-type label L1. In S19 the control unit 30 determines whether the results of the printing quality determination indicate that the printing quality of the prescribed image P1 is good. If the control unit 30 determines that the results of the printing quality determination indicate that the printing quality is good for the prescribed image P1 (S19: YES), the control unit 30 executes the process from S81 to S85, as described in the printing process of FIG. 5. When the control unit 30 determines in S85 that the printing process is not complete (S85: NO), the control unit 30 executes the sequence in S86 and S88 and returns to S13. Once the control unit 30 determines that the printing process is complete (S85: YES), the control unit 30 ends the printing process.

On the other hand, when the results of the printing quality determination indicate that the printing quality of the prescribed image P1 is poor (S19: NO), in S20 the control unit 30 halts forward feeding of the continuous medium M. In S31 the control unit 30 feeds the continuous medium M in reverse until the n-th print label L, i.e., the first-type label L1 whose prescribed image P1 has a poor printing quality, reaches the information writing position PA. Through this process, the continuous medium M is fed in reverse as indicated by arrow Y11 in Part (AA) of FIG. 10 until the RFID tag T provided on the first-type label L1 reaches the information writing position PA. When the RFID tag T furnished on the first-type label L1 arrives at the information writing position PA, the control unit 30 halts reverse feeding of the continuous medium M.

In S32 the control unit 30 executes void information writing to the RFID tag T provided on the first-type label L1 constituting the n-th print label L, which is disposed in the information writing position PA. Hereinafter, cross-hatching H2 will be added to RFID tags T that have been subjected to void information writing, as illustrated in Part (AB) of FIG. 10.

In S33 the control unit 30 feeds the continuous medium M forward until the (n+1)-th print label L reaches the information writing position PA. In Part (AC) of FIG. 10, the second print label L, which is the (n+1)-th print label L when n=1, i.e., the print label L arranged adjacent to the first-type label L1 on the upstream side in the forward direction F, is designated as the second-type label L2. Through the process of S33, the continuous medium M is fed forward, as indicated by arrow Y12, until the second-type label L2 arrives at the information writing position PA. Once the RFID tag T furnished on the second-type label L2 reaches the information writing position PA, the control unit 30 halts forward feeding of the continuous medium M.

In S35 the control unit 30 executes prescribed information writing to the RFID tag T provided on the (n+1)-th print label L, i.e., the second-type label L2, disposed in the information writing position PA. In this process, the control unit 30 acquires the prescribed information stored as the second item which is the (n+1)-th item of the database 80, that is, the prescribed information to be written to the (n+1)-th (second) print label L from the database 80, and transmits the acquired prescribed information to the information writing unit 54. The information writing unit 54 writes the received prescribed information to the RFID tag T provided on the second-type label L2. Accordingly, hatching H1 has been added to the RFID tag T provided on the second-type label L2 in Part (AD) of FIG. 10 after the second-type label L2 has undergone prescribed information writing.

In S36 the control unit 30 feeds the continuous medium M in reverse until the first-type label L1 constituting the n-th print label L reaches the printing position PB. Part (AE) of FIG. 10 shows the state of the continuous medium M having been fed in reverse, as indicated by arrow Y13, when the first-type label L1 has arrived at the printing position PB, i.e., when the downstream edge of the first-type label L1 in the forward direction F is at the same position in the conveying direction as the printing position PB. Once the first-type label L1 constituting the n-th print label L has arrived at the printing position PB, in S37 the control unit 30 halts reverse feeding of the continuous medium M and begins forward feeding of the continuous medium M. In S38 the control unit 30 executes void printing on the first-type label L1 constituting the n-th print label L and being conveyed forward from the printing position PB. Part (AF) of FIG. 10 shows the state of the first-type label L1 having been subjected to void printing in which the void image P2 is printed over the prescribed image P1. From this state, the control unit 30 continues feeding the continuous medium M forward, as indicated by arrow Y14. Therefore, the first-type label L1 having been subjected to void printing passes the fixing position PC, where the void image P2 is fixed to the first-type label L1.

In S39 the control unit 30 increments the value of n by one and updates the stored value. Hence, the control unit 30 begins to treat the second-type label L2, which is the (n+1)-th print label L, as the new n-th print label L. Subsequently, the process returns to S16. Thereafter, the control unit 30 executes the sequence in steps S16 through S19. If the control unit 30 determines in S19 that the printing quality of prescribed printing executed on the second-type label L2 constituting is the new n-th print label L is good (S19: YES), the control unit 30 executes the process from S81 to S85. If the control unit 30 determines in S85 that the printing process is not complete (S85: NO), the control unit 30 executes the sequence in S86 and S88 and returns to S13. When the control unit 30 determines that the printing process is complete (S85: YES), the control unit 30 ends the printing process. On the other hand, if the control unit 30 determines in S19 that the printing quality of the prescribed print executed on the second-type label L2 constituting the new n-th print label L is poor (S19: NO), the control unit 30 repeats the process in S20 and S31 through S39 and once again returns to S16.

In the second embodiment, the printing device 1 performs prescribed information writing to the second-type label L2 prior to performing void printing on the first-type label L1. In particular, the printing device 1 performs the prescribed information writing on the second-type label L2 in the interval after performing void information writing to the first-type label L1 and before performing void printing on the first-type label L1. As a result, after performing void information writing to the first-type label L1 that has been reverse fed to the information writing position PA in response to a determination of poor printing quality, the printing device 1 can continue to execute prescribed information writing to the second-type label L2 in S35. Subsequently, the printing device 1 reverse feeds the first-type label L1 to the printing position PB in S36 in order to execute void printing on the first-type label L1, but the amount of this reverse feed is very small. Therefore, the printing device 1 can avoid an increase in the time required to execute prescribed information writing, prescribed printing, void information writing, and void printing on a plurality of print labels L.

In the second embodiment, the process of S31 is an example of the (d) conveying of the present disclosure. The process of S32 is an example of the (e) writing of the present disclosure. The process of S38 is an example of the (f) printing of the present disclosure. The process of S35 is an example of the (g) writing of the present disclosure.

Next, a third embodiment of the present disclosure will be described with reference to FIGS. 11 through 14. The control unit 30 in the printing device 1 according to the third embodiment executes the printing process shown in FIGS. 11 and 12 in place of the printing process of the first embodiment shown in FIG. 5. The remaining configurations of the printing device 1 according to the third embodiment are identical to those in the first embodiment. Similar configurations to the first embodiment will be omitted from the description of the third embodiment accordingly. Further, the printing process shown in FIGS. 11 and 12 includes similar steps to the printing process of FIG. 5. Accordingly, steps in the printing process of FIGS. 11 and 12 that are similar to those in the printing process of FIG. 5 are designated with the same step numbers.

Figure 11:
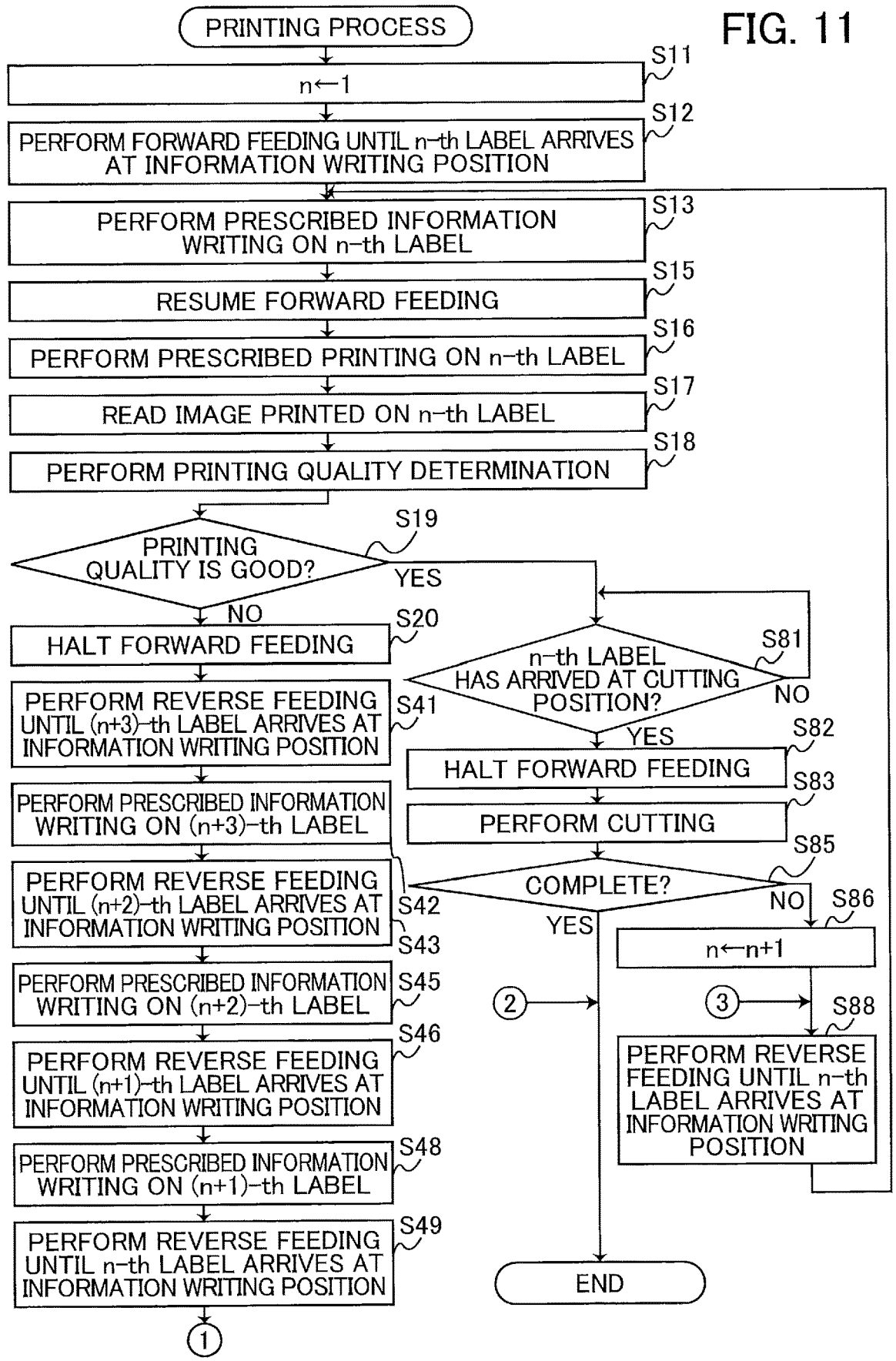
FIG. 11 is a flowchart illustrating steps in a printing process executed by a controller of a printing device in one embodiment.

At the beginning of the printing process shown in FIG. 11, the control unit 30 executes the sequence from S11 to S18. A description of these steps has been omitted since they are identical to those in the printing process of FIG. 5. In the following example, the description will be made mainly about a case in which a print defect V is produced in the prescribed image P1 printed on the print label L associated with n=1, which will be called the first-type label L1. In S19 the control unit 30 determines whether the results of the printing quality determination indicate that the printing quality of the prescribed image P1 is good. When the control unit 30 determines that the results of the printing quality determination indicate that the printing quality is good for the prescribed image P1 (S19: YES), the control unit 30 executes the sequence from S81 to S85, as described in the printing process of FIG. 5. When the control unit 30 determines in S85 that the printing process is not complete (S85: NO), the control unit 30 executes the sequence in S86 and S88 and returns to S13. Once the control unit 30 determines that the printing process is complete (S85: YES), the control unit 30 ends the printing process.

On the other hand, when the results of the printing quality determination indicate that the printing quality of the prescribed image P1 is poor (S19: NO), in S20 the control unit 30 halts forward feeding of the continuous medium M. In Part (BA) of FIG. 13, the three print labels L arranged upstream in the forward direction F from the first-type label L1, whose prescribed image P1 has poor printing quality, are designated as second-type labels L21, L22, and L23 progressing in series from the downstream side toward the upstream side. In the present embodiment, the fixing unit 40 is disposed on the conveying path Q between the printing unit 6 and reading unit 45. Therefore, one or more print labels L are arranged in the interval along the continuous medium M between the information writing position PA and the reading position PD. In the example of Part (BA) of FIG. 13, three RFID tags T are present between the first-type label L1 already read by the reading unit 45 and the information writing position PA. These three RFID tags T are provided on the second-type labels L21, L22, and L23, respectively. In S41 of FIG. 11, the control unit 30 feeds the continuous medium M in reverse until the (n+3)-th print label L on the continuous medium M, i.e., the second-type label L23 arranged farthest upstream among the second-type labels L21, L22, and L23, reaches the information writing position PA. Through this process, the continuous medium M is fed in reverse, as indicated by arrow Y21 in Part (BA) of FIG. 13, until the RFID tag T provided on the second-type label L23 arrives at the information writing position PA. When the RFID tag T on the second-type label L23 has reached the information writing position PA, the control unit 30 halts reverse feeding of the continuous medium M.

In S42 the control unit 30 executes prescribed information writing to the RFID tag T provided on the (n+3)-th print label L, i.e., the second-type label L23, disposed in the information writing position PA. In this process, the control unit 30 acquires the prescribed information stored as the fourth item, which is the (n+3)-th item when n=1, of the database 80, that is, the prescribed information to be written to the (n+3)-th (fourth) print label L from the database 80, and transmits this acquired prescribed information to the information writing unit 54. The information writing unit 54 writes the received prescribed information to the RFID tag T provided on the second-type label L23. Accordingly, in Part (BB) of FIG. 13, hatching H1 has been added to the RFID tag T provided on the second-type label L23 that has been subjected to the prescribed information writing.

In S43 the control unit 30 feeds the continuous medium M in reverse until the (n+2)-th print label L on the continuous medium M, i.e., the second-type label L22 positioned adjacent to the second-type label L23 on the downstream side in the forward direction F, reaches the information writing position PA. Through this process, the continuous medium M is reverse fed, as indicated by arrow Y22 in Part (BC) of FIG. 13, until the RFID tag T provided on the second-type label L22 arrives at the information writing position PA. When the RFID tag T on the second-type label L22 reaches the information writing position PA, the control unit 30 halts reverse feeding of the continuous medium M.

In S45 the control unit 30 executes prescribed information writing to the RFID tag T provided on the (n+2)-th print label L, i.e., the second-type label L22, arranged on the information writing position PA. In this process, the control unit 30 acquires the prescribed information stored as the third item, which is the (n+2)-th item when n=1, of the database 80, that is the prescribed information to be written to the (n+2)-th (third) print label L from the database 80, and transmits the acquired prescribed information to the information writing unit 54. The information writing unit 54 writes the received prescribed information to the RFID tag T provided on the second-type label L22. Accordingly, in Part (BD) of FIG. 13, hatching H1 has been added to the RFID tag T on the second-type label L22 that has been subjected to the prescribed information writing.

In S46 the control unit 30 feeds the continuous medium M in reverse until the (n+1)-th print label L on the continuous medium M, i.e., the second-type label L21 which is positioned adjacent to the second-type label L22 on the downstream side in the forward direction F and adjacent to the first-type label L1 on the upstream side in the forward direction F, reaches the information writing position PA. Through this process, the continuous medium M is reverse fed, as indicated by arrow Y2e in Part (BE) of FIG. 13, until the RFID tag T provided on the second-type label L21 arrives at the information writing position PA. When the RFID tag T on the second-type label L21 reaches the information writing position PA, the control unit 30 halts reverse feeding of the continuous medium M.

In S48 the control unit 30 executes prescribed information writing to the RFID tag T provided on the (n+1)-th print label L, i.e., the second-type label L21, disposed at the information writing position PA. In this process, the control unit 30 acquires the prescribed information stored as the second item, which is the (n+1)-th time when n=1, of the database 80, that is the prescribed information to be written to the (n+1)-th (second) print label L from the database 80, and transmits this acquired prescribed information to the information writing unit 54. The information writing unit 54 writes the received prescribed information to the RFID tag T on the second-type label L21. Accordingly, in Part (BF) of FIG. 13, hatching H1 has been added to the RFID tag T provided on the second-type label L21 that underwent the prescribed information writing.

In S49 the control unit 30 feeds the continuous medium M in reverse until the n-th print label L on the continuous medium M, i.e., the first-type label L, reaches the information writing position PA. In this process, the continuous medium M is reverse fed, as indicated by arrow Y24 in Part (BG) of FIG. 13, until the RFID tag T provided on the first-type label L1 arrives at the information writing position PA. When the RFID tag T on the first-type label L1 reaches the information writing position PA, the control unit 30 halts reverse feeding of the continuous medium M.

Figure 12:
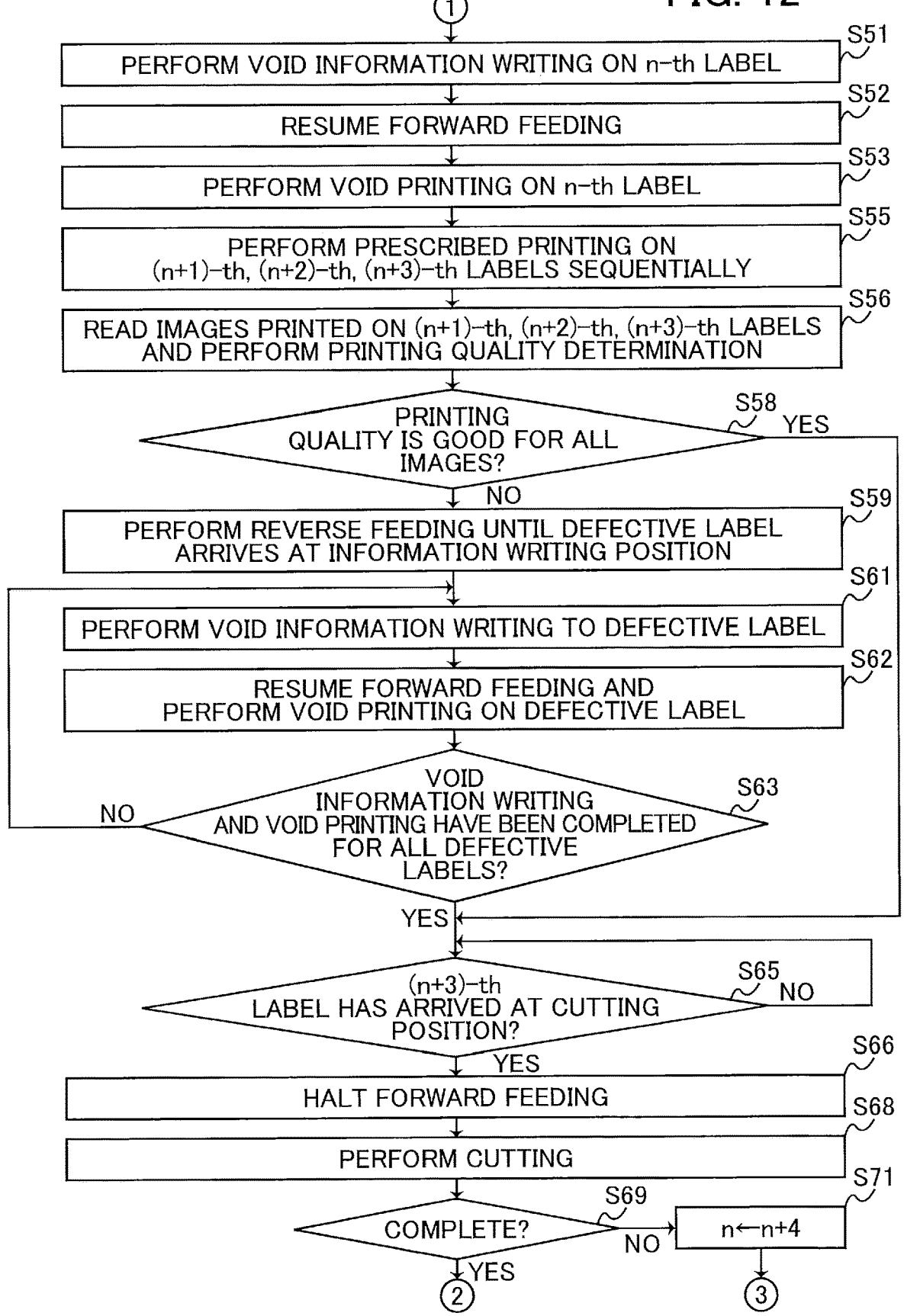
FIG. 12 is a flowchart illustrating steps in the printing process executed by the controller of the printing device in one embodiment and is a continuation of FIG. 11.
Figure 13:
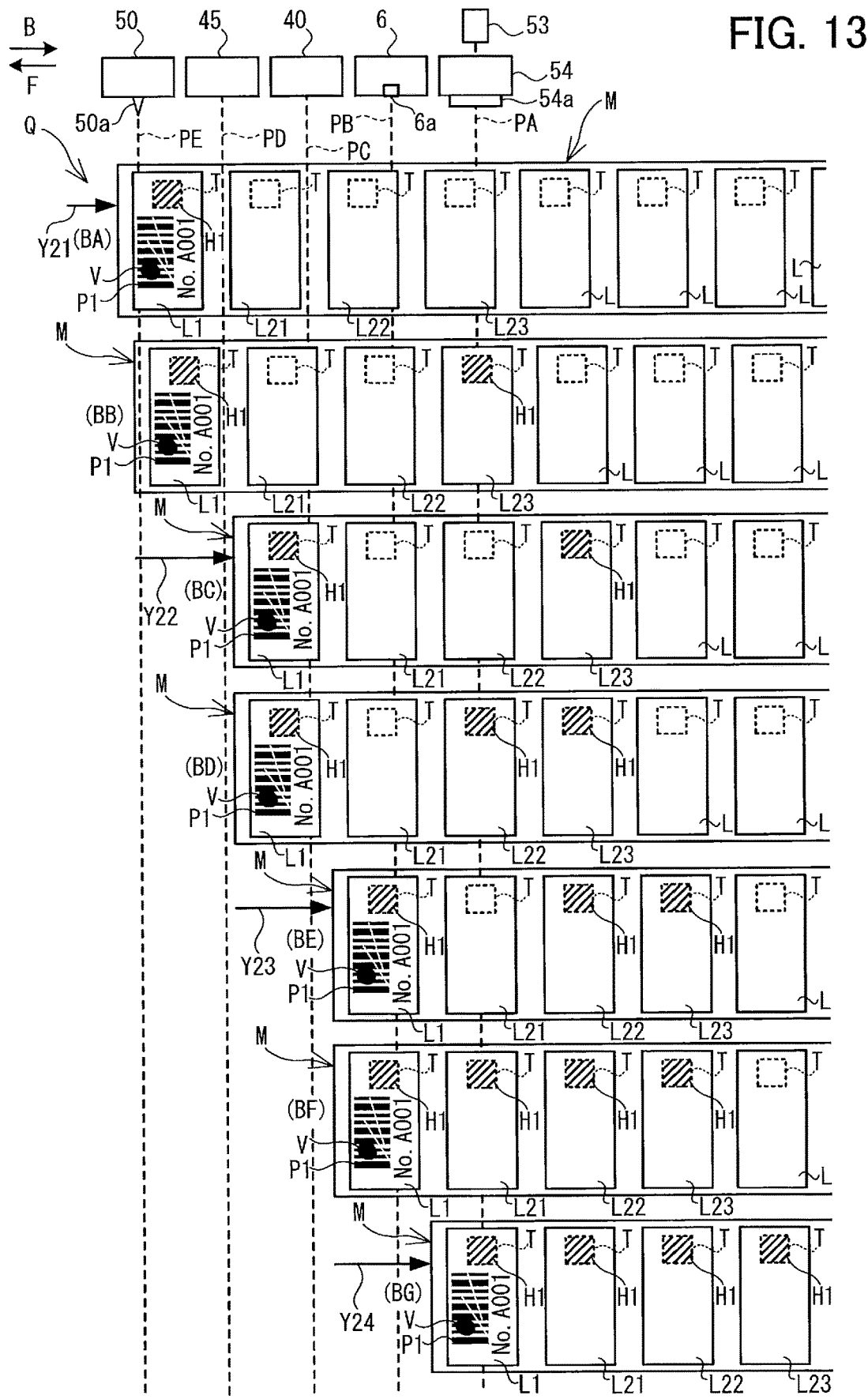
FIG. 13 is an explanatory diagram illustrating examples of a continuous medium on which the printing process shown in FIGS. 11 and 12 is being performed in one embodiment.

Next, in S51 of FIG. 12, the control unit 30 performs void information writing to the RFID tag T provided on the n-th print label L, i.e., the first-type label L1, arranged on the information writing position PA. Accordingly, in Part (BH) of FIG. 14, cross-hatching H2 has been added to the RFID tag T on the first-type label L1 that has just undergone void information writing.

Figure 14:
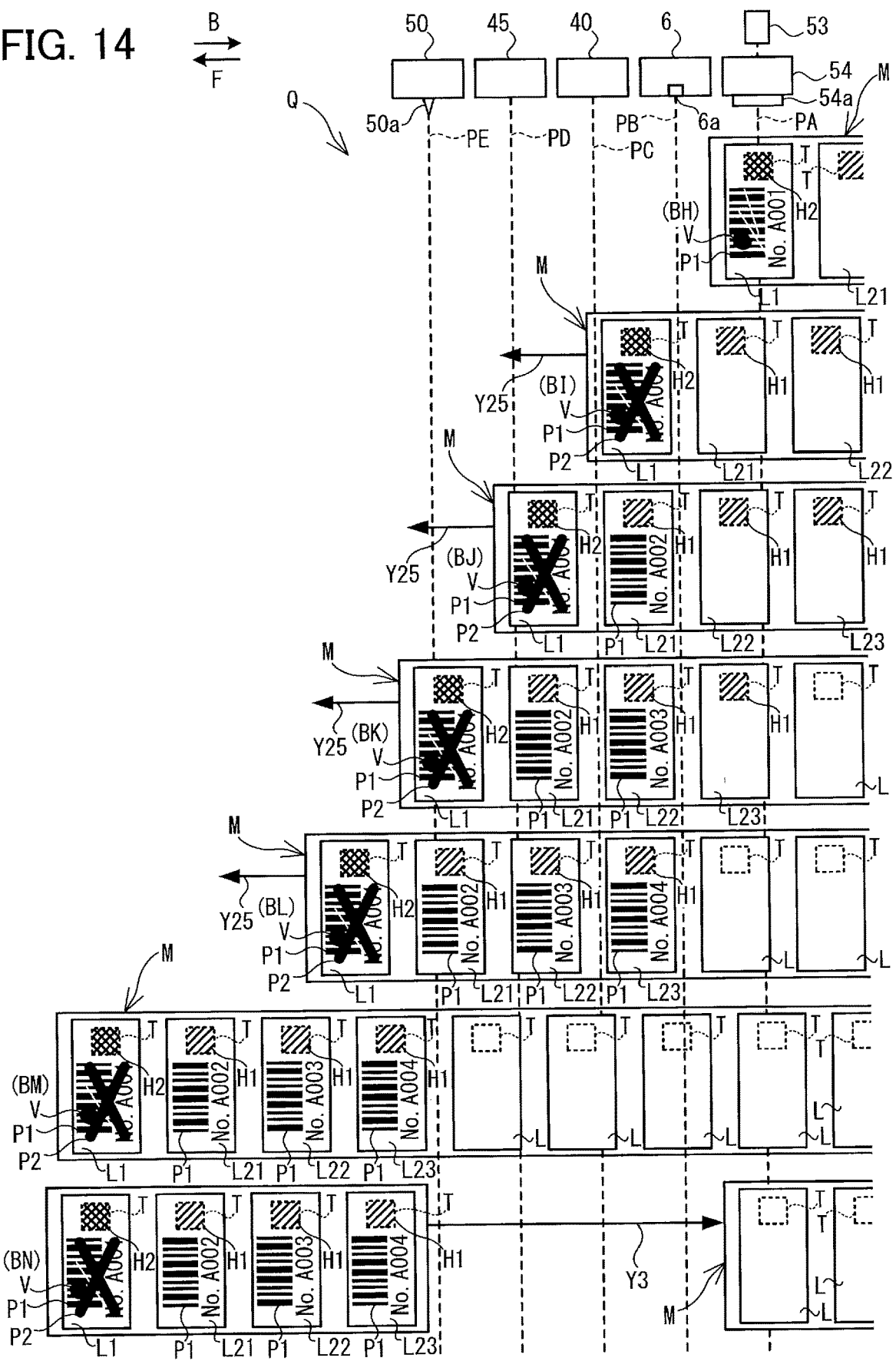
FIG. 14 is an explanatory diagram illustrating examples of the continuous medium on which the printing process shown in FIGS. 11 and 12 is being performed in one embodiment and is a continuation of FIG. 13.

In S52 the control unit 30 begins feeding the continuous medium M forward. In S53 the control unit 30 executes void printing on the first-type label L1 constituting the n-th print label L arriving at the printing position PB as the continuous medium M is fed forward. Part (BI) of FIG. 14 shows the state of the first-type label L1 after the void image P2 has been printed over the prescribed image P1 in the void printing executed on the first-type label L1. In this state, the control unit 30 continues feeding the continuous medium M forward, as indicated by arrow Y25. Therefore, the first-type label L1, on which the void printing has been executed, passes the fixing position PC, where the void image P2 is fixed to the first-type label L1.

In S55 the control unit 30 sequentially executes prescribed printing on the (n+1)-th, (n+2)-th, and (n+3)-th print labels L, which are the second-type labels L21, L22, and L23, fed forward in sequence to the printing position PB. Since n=1 in this example, the control unit 30 executes prescribed printing on the second-type label L21 fed forward to the printing position PB based on the second serial number No. A002 and the code image corresponding to the code image information associated with serial number No. A002, as illustrated in Part (BJ) of FIG. 14. The control unit 30 further executes prescribed printing on the second-type label L22 fed forward to the printing position PB based on the third serial number No. A003 and the code image corresponding to the code image information associated with serial number No. A003, as illustrated in Part (BK) of FIG. 14. The control unit 30 also executes prescribed printing on the second-type label L23 fed forward to the printing position PB based on the fourth serial number No. A004 and the code image corresponding to the code image information associated with serial number No. A004, as illustrated in Part (BL) of FIG. 14.

During this time, the continuous medium M is continuously fed forward, as indicated by arrow Y25 in Parts (BJ), (BK), and (BL) of FIG. 14. As the (n+1)-th, (n+2)-th, and (n+3)-th print labels L, which are the second-type labels L21, L22, and L23, are sequentially fed forward to the reading position PD, in S56 the control unit 30 controls the reading unit 45 to read the prescribed image P1 printed on each and acquires the reading results. In S56 the control unit 30 then performs printing quality determinations for the prescribed images P1 on the second-type labels L21, L22, and L23 constituting the (n+1)-th, (n+2)-th, and (n+3)-th print labels L based on the acquired reading results. In this example, it is assumed that the printing quality is good for all prescribed images P1 printed on the second-type labels L21, L22, and L23, with no print defects V, as illustrated in Parts (BJ), (BK), and (BL) of FIG. 14.

In S58 the control unit 30 determines whether the results of the printing quality determinations for the second-type labels L21, L22, and L23 constituting the (n+1)-th, (n+2)-th, and (n+3)-th print labels L indicate good printing quality for all the prescribed images P1. If all results from the printing quality determination for the second-type labels L21, L22, and L23 indicate good printing quality for prescribed images P1 (S58: YES), in S65 the control unit 30 determines whether the (n+3)-th print label L has arrived at the cutting position PE. The (n+3)-th print label L is the second-type label L23 arranged farthest upstream in the forward direction F among the second-type labels L21, L22, and L23. If the second-type label L23 has not yet arrived at the cutting position PE (S65: NO), the control unit 30 repeatedly performs the determination in S65 while continuing to feed the continuous medium M forward. Once the second-type label L23 arrives at the cutting position PE (S65: YES), in S66 the control unit 30 halts forward feeding of the continuous medium M. Part (BM) of FIG. 14 shows the state of the continuous medium M whose forward feeding has been halted after the second-type label L23 arrived at the cutting position PE. In S68 the control unit 30 controls the cutting unit 50 to cut the continuous medium M. As a result, a total of four print labels L, including the first-type label L1 and the second-type labels L21, L22, and L23, are cut off the continuous medium M, as illustrated in Part (BN) of FIG. 14.

In S69 the control unit 30 determines whether the printing process is complete. The control unit 30 determines that the printing process is complete when printing of prescribed images P1 on the scheduled number of print labels L is complete or when a command to quit printing has been inputted into the printing device 1 via the operation unit 4, for example. If the control unit 30 determines that the printing process is complete (S69: YES), the control unit 30 ends the printing process. However, if the control unit 30 determines that the printing process is not complete (S69: NO), in S71 the control unit 30 increments the value of n by four and updates the stored value. Subsequently, the process advances to S88 shown in FIG. 11. In S88 the control unit 30 feeds the continuous medium M in reverse in order to convey the print label L newly designated as the n-th print label L, i.e., the print label L arranged farthest downstream on the continuous medium M in the forward direction F, to the information writing position PA. Through this process, the continuous medium M is fed in reverse, as indicated by arrow Y3 in Part (BN) of FIG. 14, until the RFID tag T provided on the print label L newly designated as the n-th print label L, i.e., the print label L arranged on the continuous medium M farthest downstream in the forward direction F has arrived at the information writing position PA. When the RFID tag T furnished on the n-th print label L arrives at the information writing position PA, the control unit 30 halts reverse feeding of the continuous medium M. Thereafter, the control unit 30 executes the same sequence of steps from S13.

On the other hand, if the results of the printing quality determination for any of the second-type labels L21, L22, and L23 in S58 of FIG. 12 indicate poor printing quality for the prescribed image P1 (S58: NO), in S59 the control unit 30 feeds the continuous medium M in reverse until the print label L whose prescribed image P1 is of poor printing quality reaches the information writing position PA. Hereinafter, a print label L among the second-type labels L21, L22, and L23 determined in the printing quality determination to have a prescribed image P1 of poor printing quality will be called a defective label. Note that when there is more than one defective label, the control unit 30 feeds the continuous medium M in reverse until the defective label positioned farthest downstream in the forward direction F is at the information writing position PA. In S61 the control unit 30 executes void information writing to the RFID tag T provided on the defective label in the information writing position PA. Subsequently, in S62 the control unit 30 begins feeding the continuous medium M forward while executing void printing as the defective label reaches the printing position PB. When there is more than one defective label, the control unit 30 halts forward feeding as each defective label arrives at the information writing position PA and executes void information writing to the RFID tag T provided on the defective label in the information writing position PA. The control unit 30 also executes void printing on defective labels each time a defective label arrives at the printing position PB.

In S63 the control unit 30 determines whether void information writing and void printing have been completed for all defective labels. If there are any defective labels that have not yet been subjected to void information writing and void printing (S63: NO), the process returns to S61. When void information writing and void printing have been executed on all defective labels (S63: YES), the process advances to S65. Thereafter, the control unit 30 executes the sequence of steps from S65, as described above.

In the third embodiment, the printing device 1 performs prescribed information writing on the second-type labels L21, L22, and L23, which are a plurality of print labels L arranged upstream of the first-type label L1 in the forward direction F, prior to performing void information writing and void printing on the first-type label L1. In particular, the printing device 1 performs prescribed information writing to the second-type labels L21, L22, and L23 prior to performing void information writing to the first-type label L1. Accordingly, the printing device 1 can perform prescribed information writing to the second-type labels L21, L22, and L23 while the first-type label L1 is being reverse fed to the information writing position PA upon determining that the printing quality of the first-type label L1 is poor (S42, S45, and S48). Since the printing device 1 does not reverse feed the continuous medium M in order to perform prescribed information writing on the second-type labels L21, L22, and L23 separately from the purpose of performing void information writing and void printing on the first-type label L1, the frequency of conveying the continuous medium M can be reduced. The second-type labels L21, L22, and L23 are a plurality of print labels L arranged upstream of the first-type label L1 in the forward direction F and are all of the print labels L that pass the information writing position PA while the first-type label L1 is fed in reverse to the information writing position PA. By executing prescribed information writing to all these second-type labels L21, L22, and L23 prior to performing void information writing to the first-type label L1, the printing device 1 can greatly reduce the frequency at which the continuous medium M is fed in reverse compared to the conventional technology. Therefore, the printing device 1 can greatly reduce the time required for performing prescribed information writing, prescribed printing, void information writing, and void printing on a plurality of print labels L compared to the conventional technology. Further, the printing device 1 can greatly reduce noise generated in the printing device 1 when conveying the continuous medium M.

In the third embodiment, the process of S41 is an example of the (d) conveying of the present disclosure. The process of S51 is an example of the (e) writing of the present disclosure. The process of S53 is an example of the (f) printing of the present disclosure. The process of S42, S45, and S48 is an example of the (g) writing of the present disclosure. The second-type labels L21, L22, and L23 are examples of the plurality of second labels of the present disclosure.

While the description has been made in detail with reference to specific embodiments thereof, it would be apparent to those skilled in the art that many modifications and variations may be made thereto. For example, the printing device 1 can employ various types of print heads as the printing unit 6 in addition to an inkjet head, such as a thermal print head or an LED print head.

The information writing unit 54 need not have a function for reading information from information storage media provided on print labels L but must at least have a function for writing information to the information storage media. The information storage medium provided on the print label L is not limited to an RFID tag but may be another information storage medium that allows electronic information to be written from an external source.

In addition to devices that communicate using radio waves, as described in the above embodiments, the RFID tags T provided on the print labels L and the information writing unit 54 serving as the RFID reader/writer may communicate through methods using electromagnetic induction or microwaves, for example.

The first conveying unit 10, second conveying unit 7, fourth conveying unit 19, and fifth conveying unit 48 in the embodiments described above are configured of rollers (the conveying rollers 17, 46 and 71; the pinch rollers 18, 47, and 72; and the roll R). Further, the third conveying unit 15 is configured of rollers (the drive roller 13 and follow roller 14) and a belt (the endless belt 16). However, the first conveying unit 10, second conveying unit 7, third conveying unit 15, fourth conveying unit 19, and fifth conveying unit 48 may all be configured of rollers or may all be configured of belts.

In addition to images of barcodes and other one-dimensional codes, the code images included in the prescribed images P1 may be images of two-dimensional codes, such as QR codes ("QR code" is a Japanese registered trademark of DENSO WAVE INCORPORATED). The prescribed image P1 may also be configured to include only the code image.

In addition to an image of "X", as is used for the void image P2 to indicate that printing quality is poor, the void image may depict text such as "VOID", "Invalid", "Defective", or "Error", for example, to indicate that the printing quality is poor. The void image may also be an image of symbols depicting strikethrough lines or the like, such as "—" and "=". Alternatively, the void image may include a plurality of symbols such as "x", "□", "◯", "Δ", or the like that are arranged in a grid-like pattern, for example. In other words, the void image may be any image capable of indicating poor printing quality.

In addition to a CIS, the reading unit 45 may be configured with a barcode reader, a two-dimensional code scanner, a CCD image sensor, a CMOS image sensor, or the like that captures code images, reads data of the captured images, and outputs the data to the control unit 30.

When the printing device 1 produces a first-type label L1 having poor printing quality, the control unit 30 may simply cut off the first-type label L1 having the poor printing quality from the continuous medium M without including the second-type label L2 or the second-type labels L21, L22, and L23 that have good printing quality. Alternatively, only when the printing device 1 produces a first-type label L1 having poor printing quality, the control unit 30 may cut off just the first-type label L1, or the first-type label L1 and second-type label L2, or the second-type labels L21, L22, and L23. In other words, when a first-type label L1 of poor printing quality is not produced, the control unit 30 need not cut off all printed print labels L from the continuous medium M but may leave a plurality of printed print labels L intact.

In the embodiments described above, the information writing position PA on the conveying path Q is equivalent to the position at which the media detection unit 53 detects the leading edge of the continuous medium M, but this arrangement is merely one example. In other words, the information writing position PA and the position at which the media detection unit 53 detects the leading edge of the continuous medium M may be different positions on the conveying path Q.

As described above in the embodiments, the control unit 30 executes void information writing and void printing on first-type labels L1 determined to have poor printing quality to prevent those first-type labels L1 from being used later by mistake. However, if the first-type label L1 is determined to have poor printing quality, in the process of S22 the control unit 30 may write the same prescribed information that has been written to the RFID tag T on the first-type label L1 to the RFID tag T provided on the second-type label L2 arranged on the upstream side of the first-type label L1 in the forward direction F. Thereafter, in the process of S16 the control unit 30 prints a prescribed image P1 on the second-type label L2 that is identical to the prescribed image P1 printed on the first-type label L1. In this case, the prescribed information for the first-type label L1, which is subsequently subjected to void printing, is written to the RFID tag T provided on the second-type label L2, and the prescribed image P1 corresponding to the first-type label L1 is printed on the second-type label L2. Therefore, the printing device 1 can avoid skipping over one of the print labels L on which prescribed information writing and prescribed printing have been performed as a consequence of performing void information writing and void printing.

The above embodiments provide examples in which different prescribed information is written to each of the RFID tags T provided on a plurality of print labels L that each have a different serial number and different prescribed images P1 are printed on the print labels L having different serial numbers. However, the present disclosure may also be applied to a case in which the same prescribed information is written to all RFID tags T provided on the plurality of print labels L and the same prescribed image P1 is printed on each of the print labels L.

In the above examples, a CPU in the control unit 30 of the printing device 1 executes each step of the printing process on the printing device 1, but some or all of the steps may be executed by another electronic device (an ASIC, for example) or by a CPU or the like in an external device such as a personal computer. Alternatively, steps in the printing process may be executed through distributed processing performed by a plurality of electronic devices (a plurality of CPUs, for example). Steps may also be added to or omitted from the printing process and the order of the steps may be modified as needed. An arrangement in which an operating system (OS) or the like running on the printing device 1 performs some or all of the printing process based on instructions from the control unit 30 also falls within the scope of the present disclosure.

The external device connector 242 may be configured to allow wireless connections by external information devices. The program for executing the printing process may be downloaded via the external device connector 242 from a server connected to a network (not shown), for example, i.e., may be transmitted as transmission signals and stored in the storage unit 31. In this case, the program for executing the printing process may be saved in a non-transitory storage medium, such as a hard disk drive provided in the server.

A PC or other external information device that stores the database 80 may input the database 80 into the control unit 30 via the external device connector 242. The inputted database 80 may be stored in the storage unit 31 and referenced by the control unit 30 when the control unit 30 executes prescribed information writing and prescribed printing on the print labels L.

What is claimed is:

1. A printing device comprising:
   a conveyor configured to convey a continuous medium in a conveying direction including a forward direction and a reverse direction opposite to the forward direction, the continuous medium extending in a longitudinal direction and including a plurality of print media arranged in sequence in the longitudinal direction, the conveying direction being parallel to the longitudinal direction, the plurality of print media including a first print medium and at least one second print medium arranged upstream of the first print medium in the forward direction, each of the plurality of print media having an information storage medium;
   a writer configured to write electronic information to the information storage medium;
   a printer disposed downstream of the writer in the forward direction, the printer being configured to print an image representing print content on each of the plurality of print media while the conveyor conveys the continuous medium in the conveying direction;
   a reader disposed downstream of the printer in the forward direction, the reader being configured to read the print content represented by the image printed on each of the plurality of print media; and
   a controller configured to control the conveyor, the writer, the printer, and the reader, the controller being configured to perform:
      (a) writing prescribed information to the information storage medium provided in the first print medium;
      (b) printing a prescribed image representing prescribed content on the first print medium after the (a) writing is performed on the first print medium;
      (c) determining whether printing quality of the prescribed image printed on the first print medium is good using a reading result of the prescribed content represented by the prescribed image printed on the first print medium;
      (d) conveying the continuous medium in the reverse direction until the first print medium reaches a prescribed position based on a determination result in (c);
      (e) writing, in response to determining in (c) that the printing quality of the prescribed image is not good for the first print medium, void information to the information storage medium provided in the first print medium, the void information indicating that the printing quality of the prescribed image is not good;
      (f) printing, in response to determining in (c) that the printing quality of the prescribed image is not good for the first print medium, a VOID image on the first print medium after the (e) writing is performed on the first print medium; and
      (g) writing, in response to determining in (c) that the printing quality of the prescribed image is not good for the first print medium, the prescribed information to the information storage medium provided in each of the at least one second print medium prior to performing the (f) printing.

2. The printing device according to claim 1, wherein the (g) writing is performed before the (e) writing is performed.

3. The printing device according to claim 2, wherein the at least one second print medium comprises a single second print medium, and
   wherein the (g) writing is performed on the single second print medium after the (a) writing is performed and before the (e) writing is performed.

4. The printing device according to claim 2, wherein the at least one second print medium comprises a plurality of second print media, and
   wherein the (g) writing is performed on the plurality of second print media after the (a) writing is performed and before the (e) writing is performed.

5. The printing device according to claim 1, further comprising:
   a cutter disposed downstream of the reader in the forward direction, the cutter being configured to cut at least one print medium among the plurality of print media from the continuous medium,
   wherein the controller is configured to further control the cutter, the controller being configured to further perform:
      (h) cutting the at least one print medium including the first print medium on which the VOID image is printed from the continuous medium.

6. The printing device according to claim 1, further comprising:
   a heater disposed downstream of the printer in the forward direction and upstream of the reader in the forward direction, the heater being configured to heat each of the plurality of print media,
   wherein the controller is configured to further control the heater, the controller being configured to further perform:
      (i) heating each of the plurality of print media on which the printer performs a printing operation.

7. The printing device according to claim 1, wherein the conveyor includes at least one of a belt and a roller,
   wherein the information storage medium provided in each of the plurality of print media is an RFID tag, and the writer is an RFID reader/writer configured to read electric information from and write electric information to the RFID tag,
   wherein the printer includes an inkjet head comprising a nozzle configured to eject a liquid, and
   wherein the reader includes a contact image sensor.

8. The printing device according to claim 1, wherein the prescribed image includes a code image representing encoded information.

9. A printing method for performing printing operations on a continuous medium with a printing device, the printing device including: a conveyor configured to convey the continuous medium in a conveying direction including a forward direction and a reverse direction opposite to the forward direction, the continuous medium extending in a longitudinal direction and including a plurality of print media arranged in sequence in the longitudinal direction, the conveying direction being parallel to the longitudinal direction, the plurality of print media including a first print medium and at least one second print medium arranged upstream of the first print medium in the forward direction, each of the plurality of print media having an information storage medium; a writer configured to write electronic information to the information storage medium; a printer configured to print an image representing print content on each of the plurality of print media while the conveyor conveys the continuous medium in the conveying direction; and a reader configured to read the print content represented by the image printed on each of the plurality of print media, the printing method comprising:
- (a) writing prescribed information to the information storage medium provided in the first print medium;
- (b) printing a prescribed image representing prescribed content on the first print medium after the (a) writing is performed on the first print medium;
- (c) determining whether printing quality of the prescribed image printed on the first print medium is good using a reading result of the prescribed content represented by the prescribed image printed on the first print medium;
- (d) conveying the continuous medium in the reverse direction until the first print medium reaches a prescribed position based on a determination result in (c);
- (e) writing, in response to determining in (c) that the printing quality of the prescribed image is not good for the first print medium, void information to the information storage medium provided in the first print medium, the void information indicating that the printing quality of the prescribed image is not good;
- (f) printing, in response to determining in (c) that the printing quality of the prescribed image is not good for the first print medium, a VOID image on the first print medium after the (e) writing is performed on the first print medium; and
- (g) writing, in response to determining in (c) that the printing quality of the prescribed image is not good for the first print medium, the prescribed information to the information storage medium provided in each of the at least one second print medium prior to performing the (f) printing.

10. The printing method according to claim 9, wherein the (g) writing is performed before the (e) writing is performed.

11. The printing method according to claim 10, wherein the at least one second print medium comprises a single second print medium, and
wherein the (g) writing is performed on the single second print medium after the (a) writing is performed and before the (e) writing is performed.

12. The printing method according to claim 10, wherein the at least one second print print medium comprises a plurality of second print medium, and
wherein the (g) writing is performed on the plurality of second print medium after the (a) writing is performed and before the (e) writing is performed.

13. The printing method according to claim 9, wherein the printing device further includes: a cutter configured to cut at least one print medium among the plurality of print media from the continuous medium, and
wherein the printing method further comprises:
- (h) cutting the at least one print medium including the first print medium on which the VOID image is printed from the continuous medium.

14. The printing method according to claim 9, wherein the printing device further includes: a heater configured to heat each of the plurality of print media, and
wherein the printing method further comprises:
- (i) heating each of the plurality of print media on which the printer performs a printing operation.

15. The printing method according to claim 9, wherein the conveyor includes at least one of a belt and a roller,
wherein the information storage medium provided in each of the plurality of print media is an RFID tag, and the writer is an RFID reader/writer configured to read electric information from and write electric information to the RFID tag,
wherein the printer includes an inkjet head comprising a nozzle configured to eject a liquid, and
wherein the reader includes a contact image sensor.

16. The printing method according to claim 9, wherein the prescribed image includes a code image representing encoded information.

17. A non-transitory computer-readable storage medium storing a set of computer-readable instructions for performing printing operations on a continuous medium with a printing device, the printing device including: a conveyor configured to convey the continuous medium in a conveying direction including a forward direction and a reverse direction opposite to the forward direction, the continuous medium extending in a longitudinal direction and including a plurality of print media arranged in sequence in the longitudinal direction, the conveying direction being parallel to the longitudinal direction, the plurality of print media including a first print medium and at least one second print medium arranged upstream of the first print medium in the forward direction, each of the plurality of print media having an information storage medium; a writer configured to write electronic information to the information storage medium; a printer configured to print an image representing print content on each of the plurality of print media while the conveyor conveys the continuous medium in the conveying direction; and a reader configured to read the print content represented by the image printed on each of the plurality of print media, the set of computer-readable instructions comprising:
- (a) writing prescribed information to the information storage medium provided in the first print medium;
- (b) printing a prescribed image representing prescribed content on the first print medium after the (a) writing is performed on the first print medium;
- (c) determining whether printing quality of the prescribed image printed on the first print medium is good using a reading result of the prescribed content represented by the prescribed image printed on the first print medium;
- (d) conveying the continuous medium in the reverse direction until the first print medium reaches a prescribed position based on a determination result in (c);
- (e) writing, in response to determining in (c) that the printing quality of the prescribed image is not good for the first print medium, void information to the information storage medium provided in the first print medium, the void information indicating that the printing quality of the prescribed image is not good;
- (f) printing, in response to determining in (c) that the printing quality of the prescribed image is not good for the first print medium, a VOID image on the first print medium after the (e) writing is performed on the first print medium; and
- (g) writing, in response to determining in (c) that the printing quality of the prescribed image is not good for the first print medium, the prescribed information to the information storage medium provided in each of the at least one second print medium prior to performing the (f) printing.

18. The non-transitory computer-readable storage medium according to claim 17, wherein the (g) writing is performed before the (e) writing is performed.

19. The non-transitory computer-readable storage medium according to claim 18, wherein the at least one second print medium comprises a single second print medium, and wherein the (g) writing is performed on the single second print medium after the (a) writing is performed and before the (e) writing is performed.

20. The non-transitory computer-readable storage medium according to claim 18, wherein the at least one second print medium comprises a plurality of second print medium, and wherein the (g) writing is performed on the plurality of second print medium after the (a) writing is performed and before the (e) writing is performed.

21. The non-transitory computer-readable storage medium according to claim 17, wherein the printing device further includes: a cutter configured to cut at least one print medium among the plurality of print media from the continuous medium, and wherein the set of computer-readable instructions further comprises:

(h) cutting the at least one print medium including the first print medium on which the VOID image is printed from the continuous medium.

22. The non-transitory computer-readable storage medium according to claim 17, wherein the printing device further includes: a heater configured to heat each of the plurality of print media, and wherein the set of computer-readable instructions further comprises:

(i) heating each of the plurality of print media on which the printer performs a printing operation.

23. The non-transitory computer-readable storage medium according to claim 17, wherein the conveyor includes at least one of a belt and a roller, wherein the information storage medium provided in each of the plurality of print media is an RFID tag, and the writer is an RFID reader/writer configured to read electric information from and write electric information to the RFID tag, wherein the printer includes an inkjet head comprising a nozzle configured to eject a liquid, and wherein the reader includes a contact image sensor.

24. The non-transitory computer-readable storage medium according to claim 17, wherein the prescribed image includes a code image representing encoded information.

* * * * *